(12) United States Patent
Morita et al.

(10) Patent No.: US 12,013,582 B2
(45) Date of Patent: Jun. 18, 2024

(54) OPTICAL COMMUNICATION APPARATUS, OPTICAL COMMUNICATION METHOD, AND OPTICAL COMMUNICATION SYSTEM

(71) Applicant: SONY GROUP CORPORATION, Tokyo (JP)

(72) Inventors: Hiroshi Morita, Tokyo (JP); Kazuaki Toba, Tokyo (JP); Masanori Yamamoto, Tokyo (JP); Yusuke Oyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 339 days.

(21) Appl. No.: 17/423,323

(22) PCT Filed: Jan. 16, 2020

(86) PCT No.: PCT/JP2020/001395
§ 371 (c)(1),
(2) Date: Jul. 15, 2021

(87) PCT Pub. No.: WO2020/153237
PCT Pub. Date: Jul. 30, 2020

(65) Prior Publication Data
US 2022/0082769 A1   Mar. 17, 2022

(30) Foreign Application Priority Data

Jan. 24, 2019  (JP) .................................. 2019-010693
May 27, 2019  (JP) .................................. 2019-098724

(51) Int. Cl.
*G02B 6/35*     (2006.01)
*G02B 6/38*     (2006.01)
(Continued)

(52) U.S. Cl.
CPC ......... *G02B 6/4215* (2013.01); *G02B 6/3586* (2013.01); *G02B 6/385* (2013.01);
(Continued)

(58) Field of Classification Search
CPC .............................. G02B 6/3586; G02B 6/385
See application file for complete search history.

(56) References Cited

U.S. PATENT DOCUMENTS

| | | |
|---|---|---|
| 10,020,888 B1 | 7/2018 | Aybay et al. |
| 2001/0017961 A1 | 8/2001 | Kittaka |

(Continued)

FOREIGN PATENT DOCUMENTS

| | | |
|---|---|---|
| CN | 1309310 A | 8/2001 |
| EP | 1118889 A2 | 7/2001 |

(Continued)

OTHER PUBLICATIONS

WO 2020071128 A1 English translation (Year: 2020).*
International Search Report and Written Opinion of PCT Application No. PCT/JP2020/001395, dated Mar. 3, 2020, 10 pages of ISRWO.

*Primary Examiner* — Charlie Y Peng
(74) *Attorney, Agent, or Firm* — CHIP LAW GROUP

(57) ABSTRACT

To relax the accuracy with respect to a positional deviation, and thus to reduce costs.
An optical waveguide and a light path adjuster are included, the optical waveguide performing propagation only in a reference mode at a first wavelength, the light path adjuster adjusting a light path such that input light is guided to a core of the optical waveguide. Communication is performed using light of a second wavelength that enables the optical waveguide to perform propagation in at least a first order mode in addition to the reference mode. When there is a positional deviation, input light that is not headed for the core of the optical waveguide is guided to the core due to the light path adjuster adjusting a path of the light. This results (Continued)

in a reduction in a loss of coupling of optical power. Further, propagation is performed by the optical waveguide in at least the first order mode in addition to the reference mode, the at least the first order mode being generated due to the light path adjuster adjusting a path of the input light. This results in a reduction in a loss of coupling of optical power. This makes it possible to relax the accuracy with respect to a positional deviation, and thus to reduce costs.

13 Claims, 24 Drawing Sheets

(51) Int. Cl.
  *G02B 6/42* (2006.01)
  *H04B 10/25* (2013.01)
  *H04J 14/04* (2006.01)
(52) U.S. Cl.
  CPC ......... *G02B 6/4214* (2013.01); *G02B 6/4292* (2013.01); *H04B 10/25* (2013.01); *H04J 14/04* (2013.01)

(56) References Cited

U.S. PATENT DOCUMENTS

| 2006/0289730 A1* | 12/2006 | Niiho ................. H04B 10/2581 250/227.11 |
| 2011/0110627 A1 | 5/2011 | Tsai |
| 2019/0222309 A1 | 7/2019 | Gross et al. |
| 2021/0025780 A1* | 1/2021 | Huang ................... G01M 11/33 |

FOREIGN PATENT DOCUMENTS

| JP | 2001-201657 A | | 7/2001 | |
| JP | 2007-103731 A | | 4/2007 | |
| JP | 2009156592 A | * | 7/2009 | |
| JP | 2016-151651 A | | 8/2016 | |
| JP | 2017-072495 A | | 4/2017 | |
| TW | 476004 B | | 2/2002 | |
| WO | 2017/056889 A1 | | 4/2017 | |
| WO | 2018/027267 A1 | | 2/2018 | |
| WO | WO-2020071128 A1 | * | 4/2020 | ........ G01M 11/0207 |

* cited by examiner

Wavelength of
propagating light : 1310nm
Core diameter : 8um
NA : 0.1

Reference mode $b = ((\beta/k)^2 - n_2^2)/(n_1^2 - n_2^2)$ $V = \pi dNA/\lambda$ $V = 1.92$ $LP_{01}$, $LP_{11}$, $LP_{21}$, $LP_{02}$, $LP_{31}$, $LP_{12}$, $LP_{41}$, $LP_{22}$, $LP_{03}$, $LP_{51}$, $LP_{32}$, $LP_{61}$, $LP_{13}$, $LP_{42}$

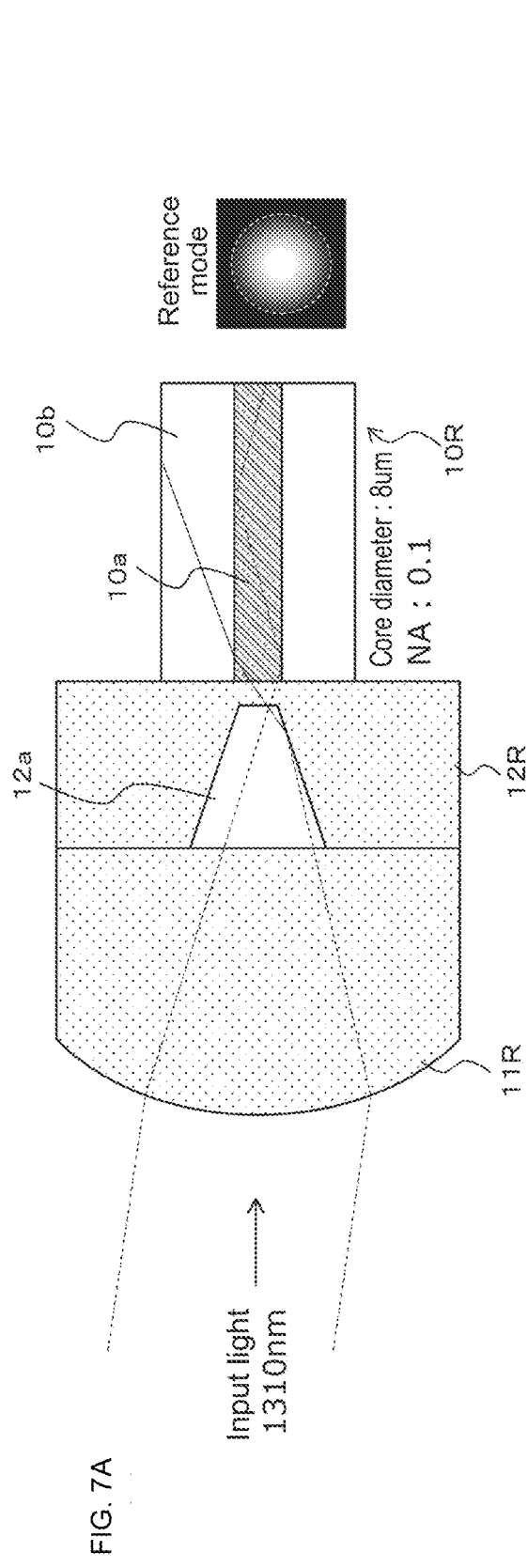
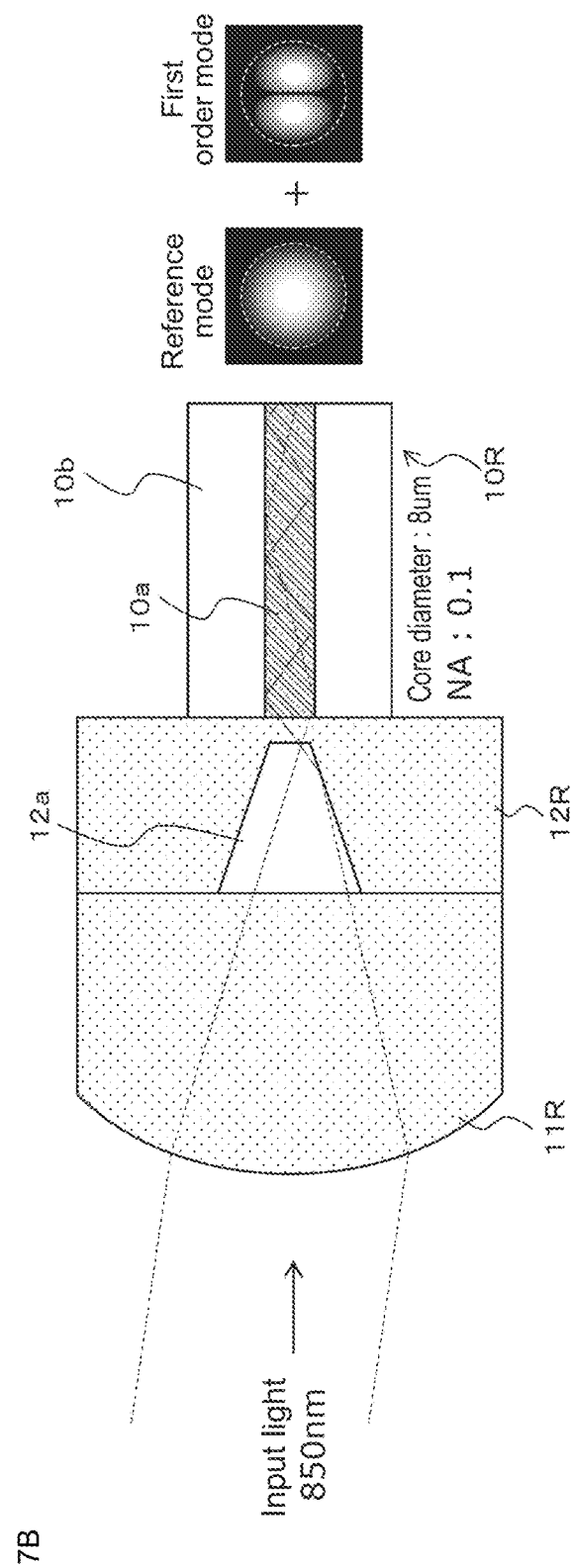

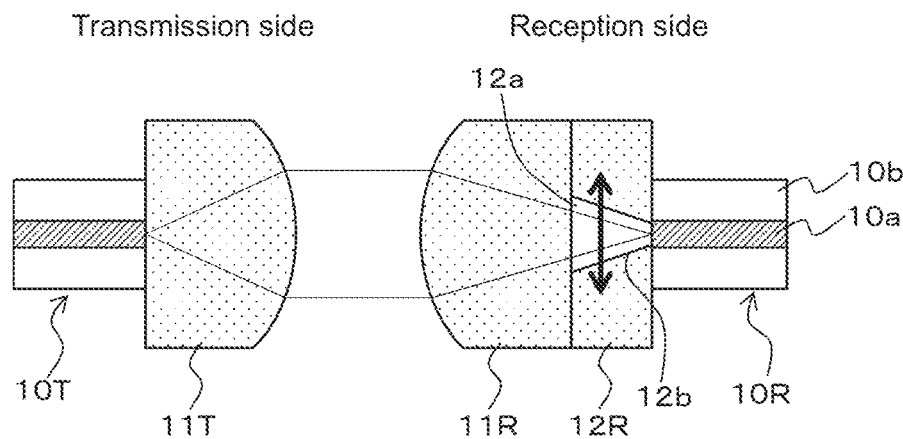
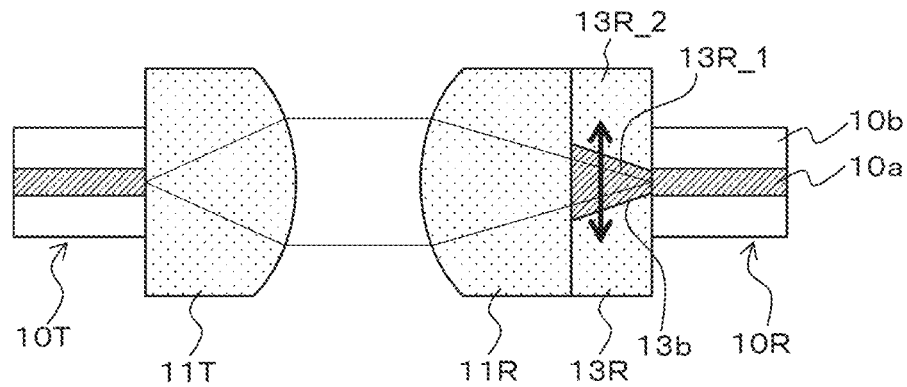
FIG.24

OPTICAL COMMUNICATION APPARATUS, OPTICAL COMMUNICATION METHOD, AND OPTICAL COMMUNICATION SYSTEM

CROSS REFERENCE TO RELATED APPLICATIONS

This application is a U.S. National Phase of International Patent Application No. PCT/JP2020/001395 filed on Jan. 16, 2020, which claims priority benefit of Japanese Patent Application No. JP 2019-010693 filed in the Japan Patent Office on Jan. 24, 2019 and also claims priority benefit of Japanese Patent Application No. JP 2019-098724 filed in the Japan Patent Office on May 27, 2019. Each of the above-referenced applications is hereby incorporated herein by reference in its entirety.

TECHNICAL FIELD

The present technology relates to an optical communication apparatus, an optical communication method, and an optical communication system. In particular, the present technology relates to, for example, an optical communication apparatus that makes it possible to relax the accuracy with respect to a positional deviation.

BACKGROUND ART

An optical communication performed by spatial coupling (for example, refer to Patent Literature 1) has been known in the past. Due to a positional deviation, the optical communication has significant losses of optical power, in particular, in a single-mode fiber. This makes great demands for the accuracy of a component in order to prevent a positional deviation. This results in an increase in costs.

CITATION LIST

Patent Literature

Patent Literature 1: WO2017/056889

DISCLOSURE OF INVENTION

Technical Problem

An object of the present technology is to relax the accuracy with respect to a positional deviation, and thus to reduce costs.

Solution to Problem

A concept of the present technology provides an optical communication apparatus that includes an optical waveguide that performs propagation only in a reference mode at a first wavelength; and a light path adjuster that adjusts a light path such that input light is guided to a core of the optical waveguide, the optical communication apparatus performing communication using light of a second wavelength that enables the optical waveguide to perform propagation in at least a first order mode in addition to the reference mode.

In the present technology, an optical waveguide and a light path adjuster are included, the optical waveguide performing propagation only in a reference mode at a first wavelength, the light path adjuster adjusting a light path such that input light is guided to a core of the optical waveguide. For example, the light path adjuster may adjust the light path due to light being reflected off a light path adjusting member that includes a tapered surface in which a diameter is gradually decreased toward an entrance side of the optical waveguide. Further, for example, the light path adjuster may adjust the light path due to light being refracted by a lens. Furthermore, for example, the light path adjuster may be provided between the core and cladding at an entrance end of the optical waveguide, and the light path adjuster may adjust the light path using a light path adjusting member that includes a surface in contact with the cladding, the surface being a surface in which a diameter sized equally to a diameter of the core is gradually increased, the light path adjusting member having a refractive index gradually varying in a direction from the core to the cladding, from a refractive index equal to a refractive index of the core to a refractive index equal to a refractive index of the cladding. Moreover, for example, the light path adjuster may be provided on an entrance side of the optical waveguide, and the light path adjuster may adjust the light path using a light path adjusting member that has a refractive index having a gradation structure in which the light path adjusting member has, on an optical axis, a refractive index equal to a refractive index of the core of the optical waveguide, and the light path adjusting member has a refractive index lower at a position, in the light path adjusting member, that is situated vertically further away from the optical axis.

Further, for example, the optical waveguide may be an optical fiber or a silicon optical waveguide. Furthermore, for example, the first wavelength may be a wavelength at which a wavelength dispersion is zero. Moreover, for example, the first wavelength may be a wavelength of between 300 nm and 5 µm. Further, for example, the first wavelength may be a wavelength in a 1310 nm band or a wavelength in a 1550 nm band.

Further, in the present technology, the optical communication apparatus performs communication using light of a second wavelength that enables the optical waveguide to perform propagation in at least a first order mode in addition to the reference mode. In this case, for example, the second wavelength may be a wavelength in an 850 nm band.

As described above, in the present technology, an optical waveguide and a light path adjuster are included, the optical waveguide performing propagation only in a reference mode at a first wavelength, the light path adjuster adjusting a light path such that input light is guided to a core of the optical waveguide. Communication is performed using light of a second wavelength that enables the optical waveguide to perform propagation in at least a first order mode in addition to the reference mode.

Thus, when there is a positional deviation, input light that is not headed for the core of the optical waveguide is guided to the core of the optical waveguide due to the light path adjuster adjusting a path of the light. Here, the angle of incidence with which transmission can be performed by the optical waveguide, is made larger by using light of the second wavelength, compared to the use of light of the first wavelength. This results in a reduction in a loss of coupling of optical power. Further, propagation is performed by the optical waveguide in at least the first order mode in addition to the reference mode, the at least the first order mode being generated due to the light path adjuster adjusting a path of the input light. This results in a reduction in a loss of coupling of optical power. This makes it possible to relax the accuracy with respect to a positional deviation, and thus to reduce costs.

Further, another concept of the present technology provides an optical communication system that includes a reception section that includes an optical waveguide and a light path adjuster, the optical waveguide performing propagation only in a reference mode at a first wavelength, the light path adjuster adjusting a light path such that input light is guided to a core of the optical waveguide; and a transmission section from which light of a second wavelength enters the optical waveguide of the reception section through the light path adjuster, the second wavelength enabling the optical waveguide to perform propagation in at least a first order mode in addition to the reference mode.

In the present technology, a reception section and a transmission section are included, the reception section including an optical waveguide and a light path adjuster, the optical waveguide performing propagation only in a reference mode at a first wavelength, the light path adjuster adjusting a light path such that input light is guided to a core of the optical waveguide. From the transmission section, light of a second wavelength enters the optical waveguide of the reception section through the light path adjuster, the second wavelength enabling the optical waveguide to perform propagation in at least a first order mode in addition to the reference mode. For example, the transmission section may be a light-emitting element, a receptacle of a transmitter, or a plug of a cable.

As described above, in the present technology, reception section includes an optical waveguide and a light path adjuster, the optical waveguide performing propagation only in a reference mode at a first wavelength, the light path adjuster adjusting a light path such that input light is guided to a core of the optical waveguide. From the transmission section, light of a second wavelength enters the optical waveguide of the reception section through the light path adjuster, the second wavelength enabling the optical waveguide to perform propagation in at least a first order mode in addition to the reference mode.

Thus, when there is a positional deviation, input light that is not headed for the core of the optical waveguide of the reception section from the transmission section is guided to the core of the optical waveguide due to the light path adjuster adjusting a path of the light. Here, the angle of incidence with which transmission can be performed by the optical waveguide, is made larger by using light of the second wavelength, compared to the use of light of the first wavelength. This results in a reduction in a loss of coupling of optical power. Further, propagation is performed by the optical waveguide in at least the first order mode in addition to the reference mode, the at least the first order mode being generated due to the light path adjuster adjusting a path of the input light. This results in a reduction in a loss of coupling of optical power. This makes it possible to relax the accuracy with respect to a positional deviation, and thus to reduce costs.

BRIEF DESCRIPTION OF DRAWINGS

FIGS. 7A and 7B are diagrams for describing a case of arranging the light path adjusting member on the entrance side of the optical fiber when the wavelength of input light is 1310 nm, and a case of arranging the light path adjusting member on the entrance side of the optical fiber when the wavelength of the input light is 850 nm.

FIGS. 24A and 24B are diagrams for describing another example of a configuration of a light path adjuster.

MODE(S) FOR CARRYING OUT THE INVENTION

Embodiments for carrying out the present technology (hereinafter referred to as "embodiments") will now be described below. Note that the description is made in the following order.
1. Embodiments
2. Modifications 1. Embodiments

[Basic Description of Present Technology]

Figure 1:
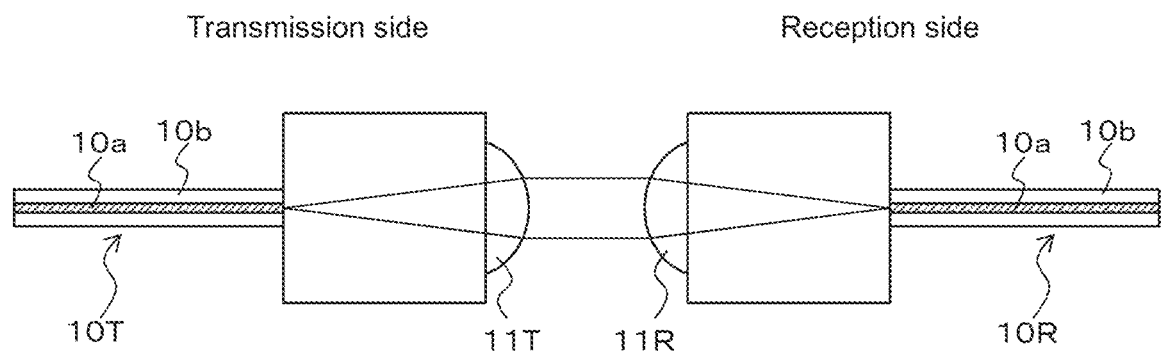
FIG. 1 illustrates an outline of an optical communication performed by spatial coupling.

First, a technology related to the present technology is described. FIG. 1 illustrates an outline of an optical communication performed by spatial coupling. In this case, light exiting an optical fiber 10T on the transmission side is formed into collimated light by a lens 11T on the transmission side, and the collimated light exits the lens 11T. Then, the collimated light is collected by a lens 11R on the reception side, and enters an optical fiber 10R on the reception side. Due to a positional deviation, the optical communication has significant losses of optical power, in particular, in a single-mode fiber. Note that the optical fibers 10T and 10R each have a two-layer structure including a core 10a and cladding 10b, the core 10a being a center portion that serves as a light path, the cladding 10b covering a peripheral surface of the core 10a.

Figure 2A:
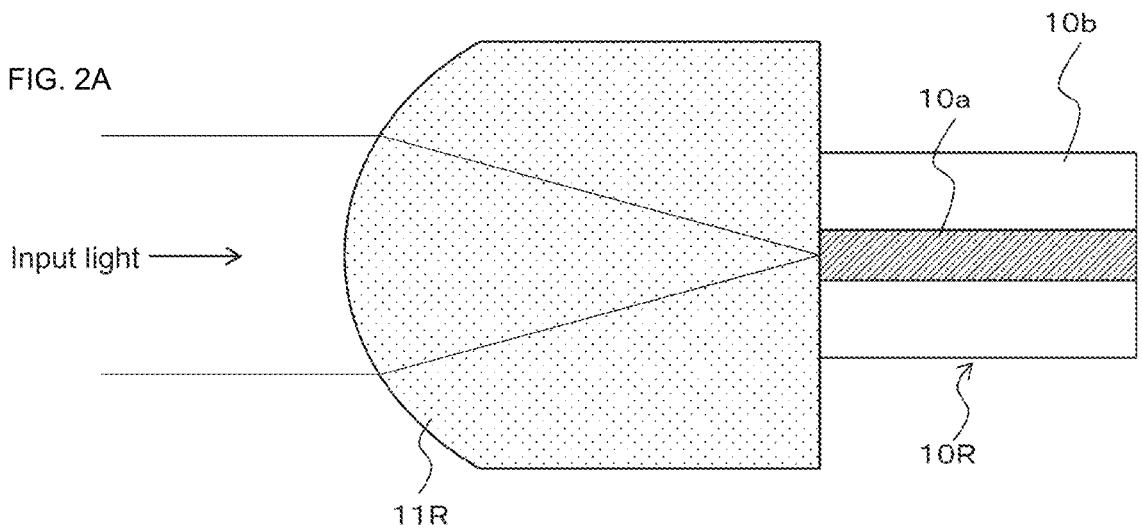
FIGS. 2A and 2B are diagrams for describing a loss of optical power due to a deviation with respect to an optical axis.
Figure 2B:
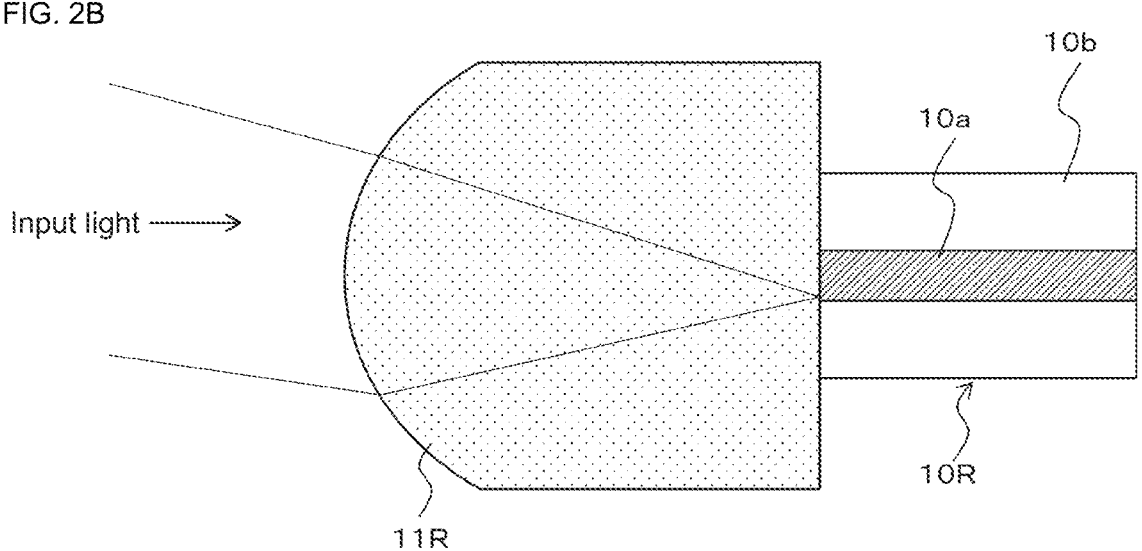

FIG. 2A illustrates, for example, a state in which an optical axis of the optical fiber 10T coincides an optical axis of the lens 11T on the transmission side. In this case, a light collecting point on the reception side is situated in a portion around the center of the core 10a at an entrance end of the optical fiber 10R, and this results in a reduced loss of optical power. On the other hand, FIG. 2B illustrates, for example, a state in which the optical axis of the optical fiber 10T deviates from the optical axis of the lens 11T on the transmission side. In this case, the light collecting point on the reception side is shifted from the portion around the center of the core 10a at the entrance end of the optical fiber 10R, and this results in an increased loss of optical power.

Figure 3A:
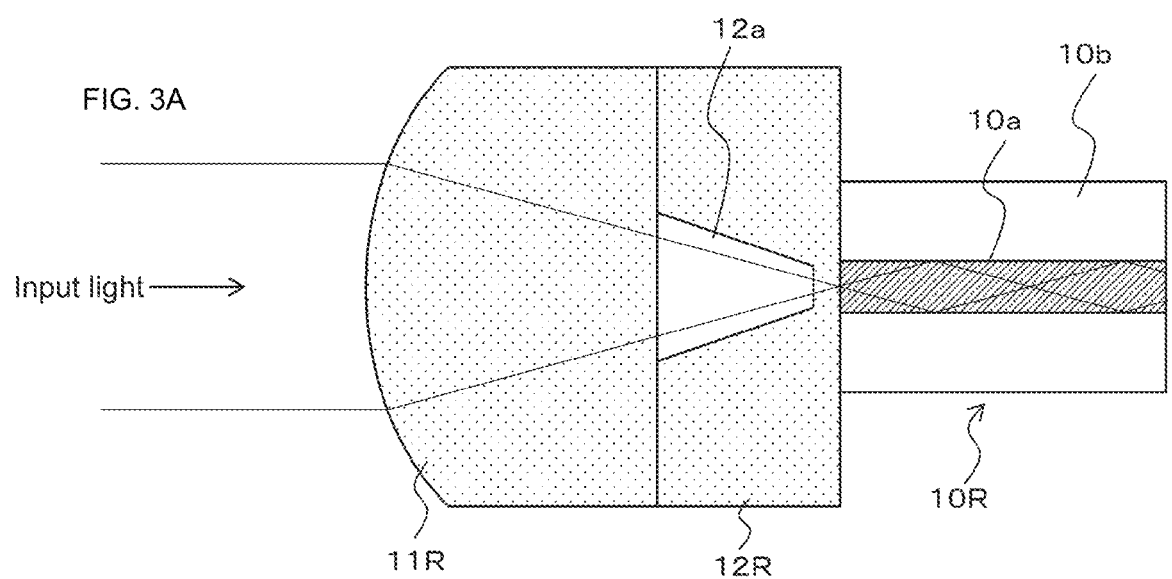
FIGS. 3A and 3B are diagrams for describing a case of arranging a light path adjusting member on an entrance side of an optical fiber.
Figure 3B:
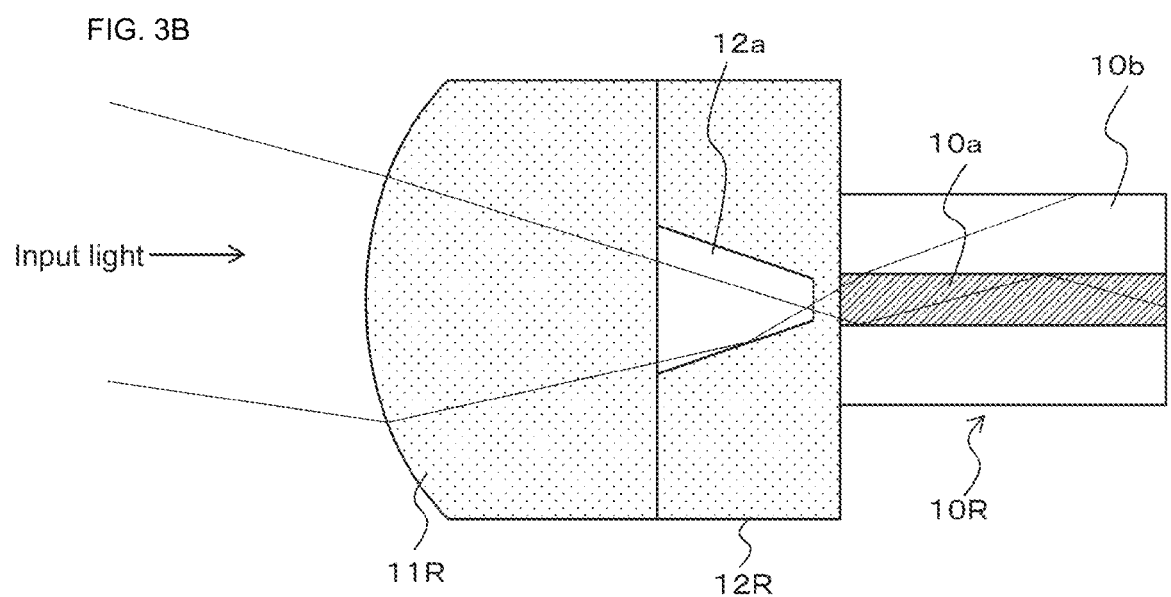

It is conceivable that a light path adjusting member 12R will be arranged on an entrance side of the optical fiber 10R, as illustrated in FIGS. 3A and 3B, in order to suppress the above-described loss of optical power due to a positional deviation. The light path adjusting member 12R adjusts a light path such that incident light is guided to the entrance end (a core end) of the optical fiber 10R. For example, as illustrated in the figure, the light path adjusting member 12R is a member that includes a portion having a shape of which the diameter is gradually decreased toward the entrance side of the optical fiber 10R, that is, a member that includes a funnel-shaped space 12a. A mirror is arranged on a wall surface of the funnel-shaped space 12a such that input light is totally reflected. The mirror is not limited to being separately generated and being fixed on the wall surface, and the mirror may be formed on an inclined surface by, for example, vapor deposition. Note that the figure illustrates an example in which the funnel-shaped space 12a is filled with air. However, it is also conceivable that input light will be totally reflected by filling the funnel-shaped space 12a with a member having a refractive index higher than the member of the other portion, instead of filling the funnel-shaped space 12a with air.

As in the case of FIG. 2A, FIG. 3A illustrates, for example, a state in which the optical axis of the optical fiber 10T coincides the optical axis of the lens 11T on the transmission side. In this case, input light collected by the lens 11R enters the portion around the center of the core 10a at the entrance end of the optical fiber 10R without striking the wall of the funnel-shaped space 12a of the light path adjusting member 12R.

On the other hand, as in the case of FIG. 2B, FIG. 3B illustrates, for example, a state in which the optical axis of the optical fiber 10T deviates from the optical axis of the lens 11T on the transmission side. In this case, light, from among input light collected by the lens 11R, that is not headed for the core 10a at the entrance end of the optical fiber 10R strikes the wall of the funnel-shaped space 12a of the light path adjusting member 12R to be totally reflected off the wall of the funnel-shaped space 12a. Consequently, there is a change in a path of the light such that the light is headed for the core 10a at the entrance end of the optical fiber 10R.

When an allowable positional deviation is increased using the light path adjusting member 12R, as described above, and when an original angle of incidence is equal to an angle of incidence determined by an NA, light totally reflected off the wall of the funnel-shaped space 12a enters the optical fiber 10R more steeply, as illustrated in FIG. 3B. Thus, the angle of incidence of the light exceeds the angle of incidence determined by an NA, and is not transmitted through the optical fiber 10R. This results in loss. Therefore, when the light path adjusting member 12R is used, there is a need for a design in which the original angle of incidence is sufficiently smaller than the angle of incidence determined by an NA such that the angle of incidence of light totally reflected off the wall of the funnel-shaped space 12a does not exceed the angle of incidence determined by an NA.

For example, in the case of an optical communication using collimated light, as illustrated in FIG. 1, the angle of incidence on the optical fiber 10R on the reception side can be made smaller by making a diameter of collimated light smaller, or by increasing a radius of curvature of the lens 11R on the reception side to make a distance between the lens 11R and the optical fiber longer. Dust and the like will easily enter when a diameter of collimated light is made smaller, and parts themselves will be made larger when there is an increase in a distance between a lens and a fiber. This makes greater demands for the accuracy in aligning optical axes of a lens and a fiber. This results in an increase in costs at the end.

Next, a basic idea about a mode is described. In order to perform propagation through an optical fiber in a single mode, there is a need to determine parameters for the fiber, such as a refractive index and a core diameter, such that there is only one mode.

Figure 4A:
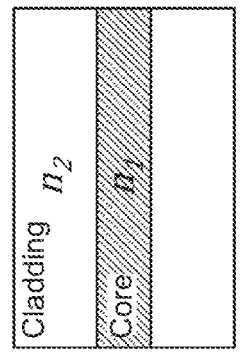
FIGS. 4A and 4B are diagrams illustrating a basic structure of an optical fiber and a linearly polarized mode (LPml mode) for a step-index optical fiber.

FIG. 4A illustrates a basic structure of an optical fiber. The optical fiber has a structure in which a center portion called "core" is covered with a layer called "cladding". In this case, a refractive index $n_1$ of the core is set high, and a refractive index $n_2$ of the cladding is set low. Light in a state of being confined in the core propagates.

Figure 4B:
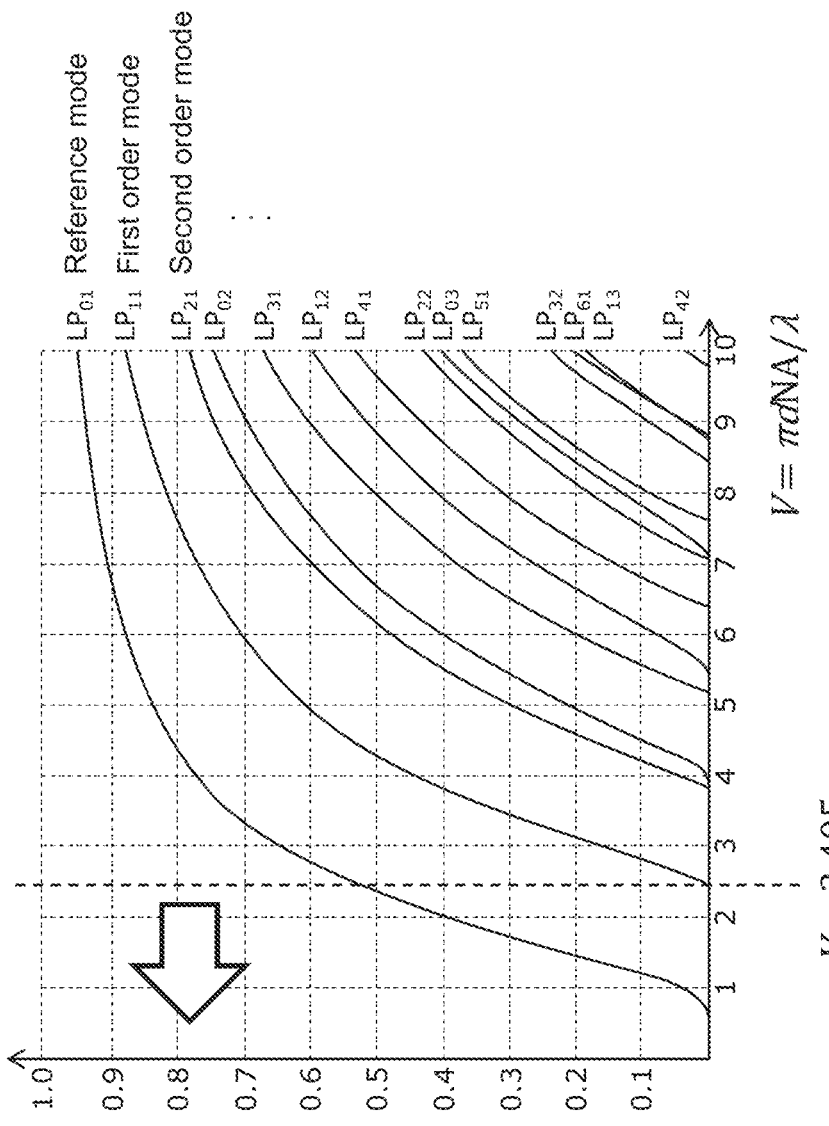

FIG. 4B illustrates a linearly polarized mode (LPml mode) for a step-index optical fiber, where a normalized propagation constant b is given in the form of a function of a normalized frequency V. The vertical axis represents the normalized propagation constant b, where b=0 when propagation is not performed in a certain mode (a certain mode is interrupted), and b has a value closer to 1 as a larger amount of optical power is confined in a core (can be propagated). The horizontal axis represents the normalized frequency V, and the normalized frequency V can be represented by Formula (1) indicated below. Here, d is a core diameter, NA is a numerical aperture, and λ is a light wavelength.

$$V = \pi d NA/\lambda \quad (1)$$

For example, when V=2.405, LP11 is interrupted, and thus LP01 is a sole existing mode. Thus, a state in which V is equal to or less than 2.405 corresponds to a state of a single mode. Here, LP01 is a reference mode (zero order mode), and subsequently, LP11, LP21, . . . are a first order mode, a second order mode . . . , respectively.

Figures 5A, 5B:
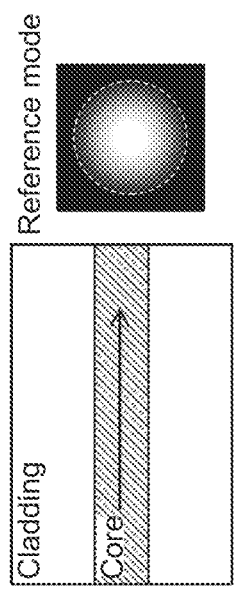
FIGS. 5A and 5B are diagrams used to discuss a normalized frequency V in the case of 1310 nm, which is a typical wavelength for a single mode.

For example, the normalized frequency V in the case of 1310 nm, as illustrated in of FIG. 5A, is discussed, where 1310 nm is a typical wavelength for the single mode. Here, when the core diameter d is 8 μm and the numerical aperture NA is 0.1, which respectively represent typical parameters for a 1310 nm optical fiber, and when the wavelength of light that propagates through the fiber is 1310 nm, V=1.92 is obtained using Formula (1).

Thus, the normalized frequency V is equal to or less than 2.405, as illustrated in FIG. 5. Consequently, propagation is performed only in the reference mode LP01, and this results in propagation being performed in a single mode. Here, the number of modes in which propagation can be performed is increased as the core diameter becomes larger. Note that, for example, a typical multimode fiber has a core diameter of, for example, 50 μm, and this results in propagation being performed in several hundred modes.

In the case of the optical communication performed by spatial coupling as illustrated in FIG. 1, there is a need to strictly align an optical coupling portion on the transmission side with an optical coupling portion on the reception side in the single mode, since the core diameter for the single mode is small. This makes greater demands for the accuracy in order to perform an accurate alignment with respect to an optical axis.

Typically, a precision component is used or a portion for inputting light to an optical fiber is processed to facilitate an insertion of light into a core of a fiber, in order to solve the issue described above. However, the precision component is expensive, and the necessity for processing results in an increase in costs for the processing. Thus, a connector and a system that are used for a single-mode communication are generally expensive.

Figures 6A, 6B:
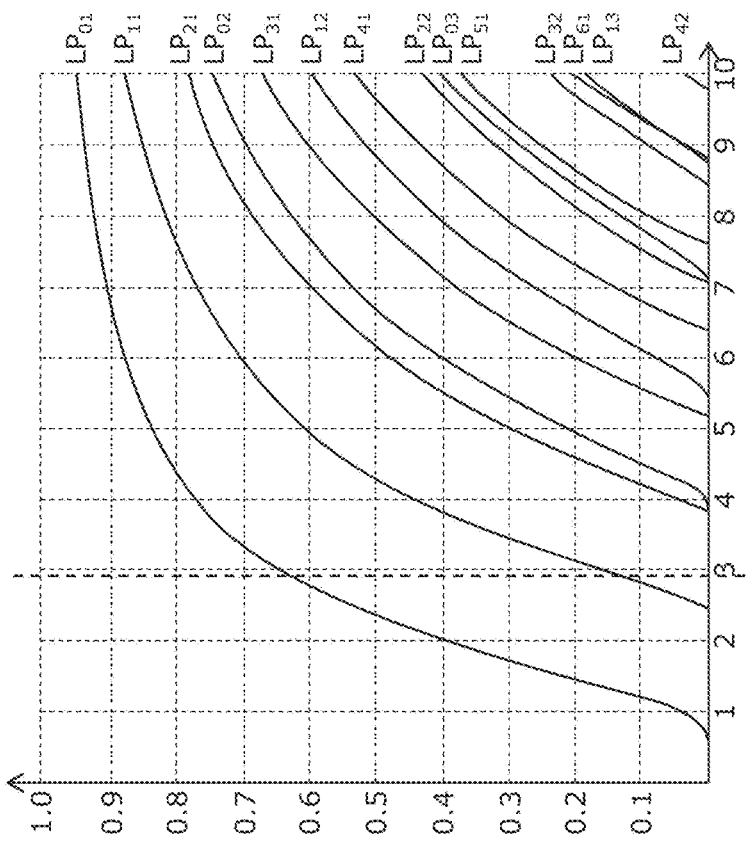
FIGS. 6A and 6B are diagrams describing the fact that there may be a reference mode LP01 and a first order mode LP11 when light of a wavelength of 850 nm is input to a 1310 nm single-mode fiber.

The present technology uses two or more modes, that is, a reference mode and at least a first order mode, and makes it possible to relax the accuracy with respect to a positional deviation, and thus to reduce costs. For example, when light of a wavelength of 850 nm, instead of 1310 nm, is input to an optical fiber with the same condition as FIG. 5A, the normalized frequency V=2.96, as illustrated in FIG. 6B. Thus, there may be the reference mode LP01 and the first order mode LP11, as illustrated in FIG. 6A.

As in the case of FIGS. 3A and 3B, FIGS. 7A and 7B illustrates an example of arranging the light path adjusting member 12R on the entrance side of the optical fiber 10R. Further, in this example, the optical fiber 10R serves as a single-mode fiber at a wavelength of 1310 nm (refer to FIGS. 5A and 5B). Furthermore, in this example, FIGS. 7A and 7B each illustrate, for example, a state in which the optical axis of the optical fiber 10T deviates from the optical axis of the lens 11T on the transmission side.

FIG. 7A illustrates an example in which the wavelength of input light is 1310 nm. In this case, the optical fiber 10R performs propagation only in a reference mode (refer to FIGS. 5A and 5B). Thus, propagation is not performed in a first order mode into which a portion of the reference mode is converted when light that is not headed for the core 10a at the entrance end of the optical fiber 10R strikes the wall of the funnel-shaped space 12a of the light path adjusting member 12R to be totally reflected off the wall of the funnel-shaped space 12a. This results in loss. Further, in this case, when an original angle of incidence is equal to an angle of incidence determined by an NA, light totally reflected off the wall of the funnel-shaped space 12a enters the optical fiber 10R more steeply. Thus, the angle of incidence of the light exceeds the angle of incidence determined by an NA, and the light is not transmitted through the optical fiber 10R. This results in loss.

On the other hand, FIG. 7B illustrates an example in which the wavelength of input light is 850 nm. In this case, the optical fiber 10R performs propagation in the first order mode in addition to the reference mode (refer to FIGS. 6A and 6B). Thus, propagation can also be performed in the first order mode into which a portion of the reference mode is converted when light that is not headed for the core 10a at the entrance end of the optical fiber 10R strikes the wall of the funnel-shaped space 12a of the light path adjusting member 12R to be totally reflected off the wall of the funnel-shaped space 12a. Further, in this case, the NA when the wavelength of input light is 850 nm, is larger than the NA when the wavelength of input light is 1310 nm. Consequently, light that is totally reflected off the wall of the funnel-shaped space 12a and enters the optical fiber 10R more steeply, can also be transmitted by the total reflection.

Figure 8:
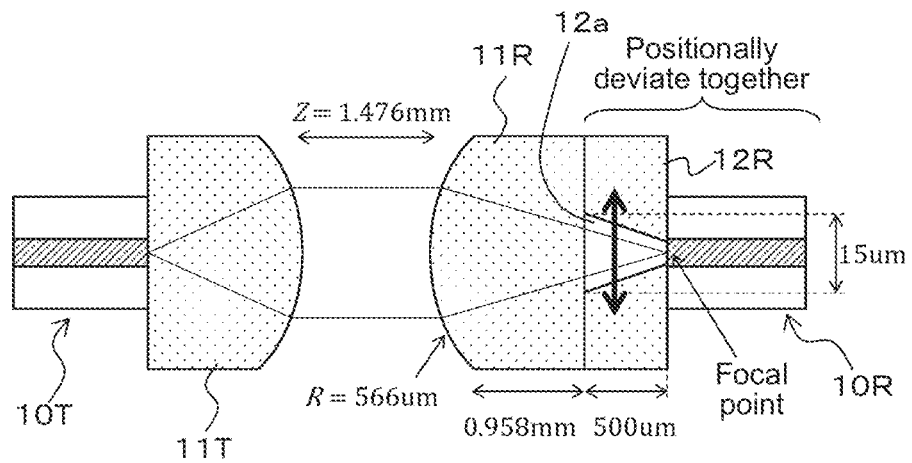
FIG. 8 is a diagram used to discuss a case in which the focal point is aligned with an entrance end of the optical fiber and the positions of the light path adjusting member and the optical fiber on the reception side are shifted in a direction vertical to an optical axis.

The following case is discussed: under the condition that there is only the reference mode LP01 for input light and the angle of incidence of the input light is equal to an angle of incidence determined by an NA when an optical system as illustrated in FIG. 8 is formed, the positions of the light path adjusting member 12R and the optical fiber 10R on the reception side are shifted in a direction vertical to an optical axis. Note that, in this case, the focal point is aligned with the entrance end of the optical fiber 10R.

Figure 9:
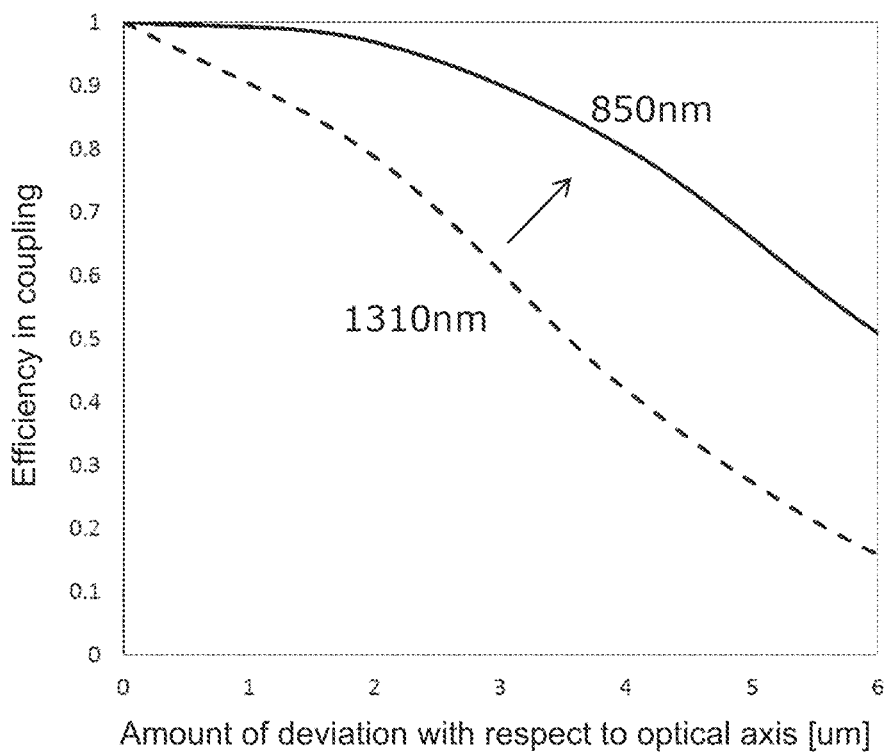
FIG. 9 is a graph of a result of simulating amounts of loss when a wavelength of input light is 1310 nm and when the wavelength of the input light is 850 nm.

FIG. 9 is a graph of a result of simulating an amount of loss in the case described above. The horizontal axis represents an amount of a deviation with respect to an optical axis, and the vertical axis represents the efficiency in coupling. When there is no deviation, 100% of power propagates through an optical fiber, where the efficiency in coupling is 1. Further, when, for example, only 50% of the power in input light propagates through the optical fiber, the efficiency in coupling is 0.5.

When the case in which a wavelength of the input light is 1310 nm and the case in which the wavelength of the input light is 850 nm are compared, it is understood, from the comparison, that better characteristics are exhibited in the case of 850 nm. The reason is that propagation is performed only in the reference mode in the case of 1310 nm, whereas propagation is performed in the first order mode in addition to the reference mode in the case of 850 nm (refer to FIG. 6A).

In other words, when there is no deviation with respect to an optical axis, there is only a reference mode for input light that enters the optical fiber 10R. On the other hand, when there is a deviation with respect to an optical axis, a portion of or all of the input light strikes the wall of the funnel-shaped space 12a of the light path adjusting member 12R to be totally reflected off the wall of the funnel-shaped space 12a, and then enters the optical fiber 10R. With respect to a portion of the input light, the reference mode is converted into a first order mode at this point. Propagation is not allowed to be performed in the first order mode in the case of 1310 nm, whereas propagation can also be performed in the first order mode in the case of 850 nm. Thus, better characteristics are exhibited in the case of 850 nm.

Figure 10:
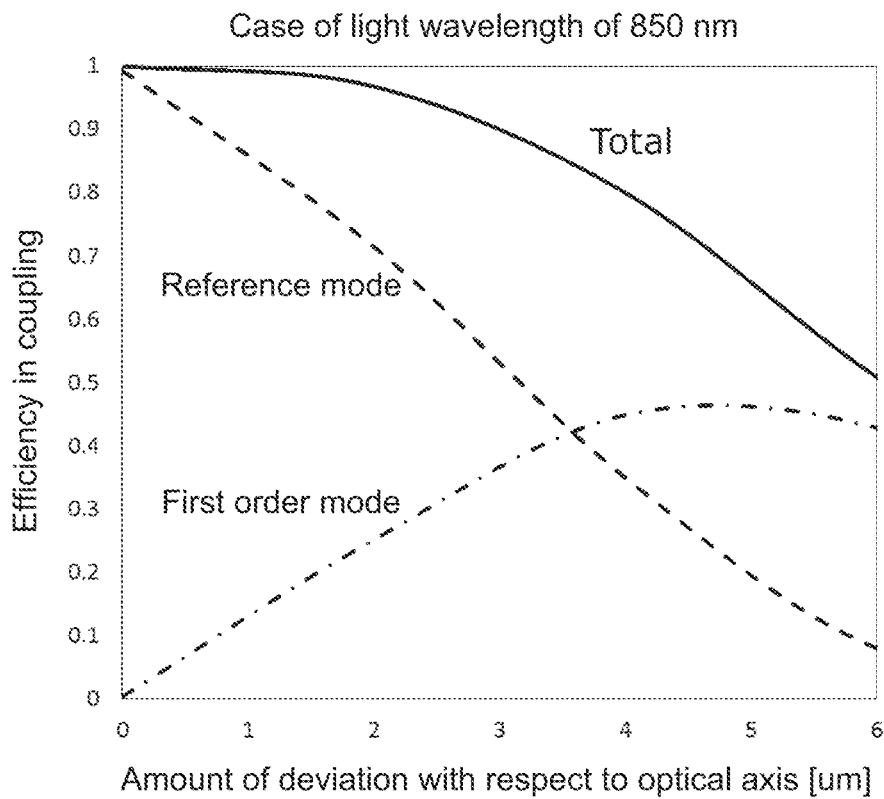
FIG. 10 is a graph describing the fact that the reference mode is converted into the first order mode according to the deviation.

In a graph of FIG. 10, a component of a reference mode (zero order mode) and a component of a first order mode are separately given, and the sum of them is represented by a curve Total. It is understood that a portion of the reference mode is converted into the first order mode according to the deviation since there is only the reference mode for input light. On the other hand, in the case of 1310 nm, there is a simple reduction in reference mode, as illustrated in FIG. 9, since propagation is performed only in the reference mode, as illustrated in FIG. 5A.

The case of 1310 nm and the case of 850 nm are compared with reference to FIG. 9. At a point in which the amount of a deviation with respect to an optical axis is 2 µm, the efficiency in coupling is about 1.23 times higher in the case of 850 nm than in the case of 1310 nm, and at a point in which the amount of a deviation with respect to an optical axis is 4 µm, the efficiency in coupling is about 1.9 times higher in the case of 850 nm than in the case of 1310 nm. This shows that the use of light of a wavelength of 850 nm makes it possible to relax the accuracy.

Figure 11:
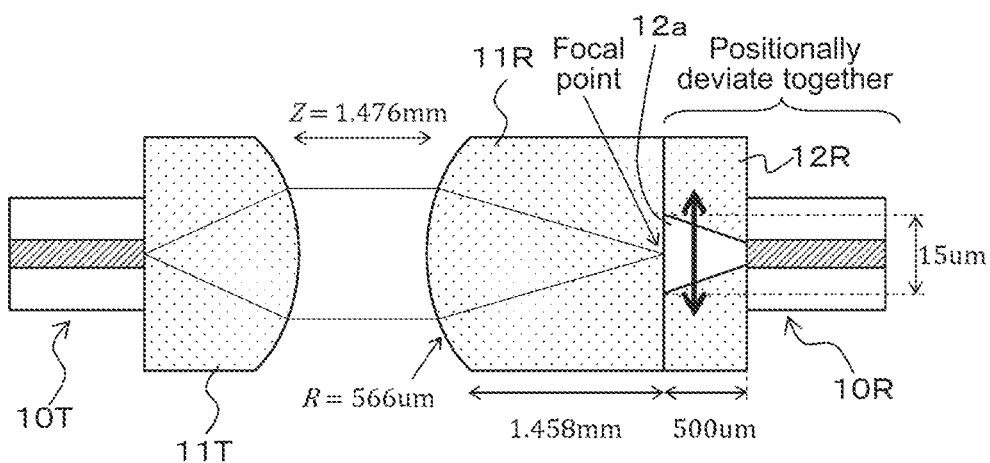
FIG. 11 is a diagram used to discuss a case in which the focal point is aligned with an entrance of a funnel-shaped space and the positions of the light path adjusting member and the optical fiber on the reception side are shifted in a direction vertical to the optical axis.

Further, the following case is discussed: under the condition that there is only the reference mode LP01 for input light and the angle of incidence of the input light is equal to an angle of incidence determined by an NA when an optical system as illustrated in FIG. 11 is formed, the positions of the light path adjusting member 12R and the optical fiber 10R on the reception side are shifted in a direction vertical to an optical axis. Note that, in this case, the focal point is aligned with an entrance of the funnel-shaped space 12a.

Figure 12:
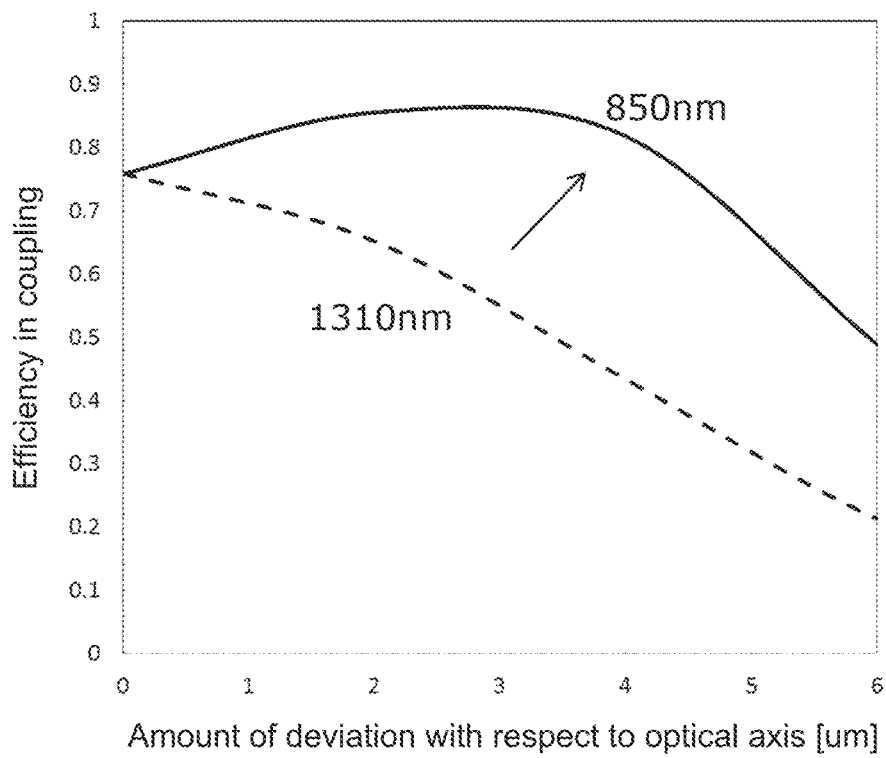
FIG. 12 is a graph of a result of simulating amounts of loss when a wavelength of input light is 1310 nm and when the wavelength of the input light is 850 nm.

FIG. 12 is a graph of a result of simulating an amount of loss in the case described above. The horizontal axis represents an amount of a deviation with respect to an optical axis, and the vertical axis represents the efficiency in coupling. When there is no deviation, the efficiency in coupling is about 0.76. The reason that the efficiency in coupling is not 1 is that the focal point is aligned with the entrance of the funnel-shaped space 12a, as described above, to set the distance to the lens such that the efficiency in coupling at this point is 1.

When the case in which a wavelength of the input light is 1310 nm and the case in which the wavelength of the input light is 850 nm are compared, it is understood, from the comparison, that better characteristics are exhibited in the case of 850 nm. The reason is that propagation is performed only in the reference mode in the case of 1310 nm, whereas propagation is performed in the first order mode in addition to the reference mode in the case of 850 nm (refer t of FIG. 6A).

In other words, when there is no deviation with respect to an optical axis, there is only a reference mode for input light that enters the optical fiber 10R. On the other hand, when there is a deviation with respect to an optical axis, a portion of or all of the input light strikes the wall of the funnel-shaped space 12a of the light path adjusting member 12R to be totally reflected off the wall of the funnel-shaped space 12a, and then enters the optical fiber 10R. With respect to a portion of the input light, the reference mode is converted into a first order mode at this point. Propagation is not allowed to be performed in the first order mode in the case of 1310 nm, whereas propagation can also be performed in the first order mode in the case of 850 nm. Thus, better characteristics are exhibited in the case of 850 nm.

The following is the reason that the efficiency in coupling is high up to a point of a deviation of about 4 µm when the wavelength of input light is 850 nm. The focal point is aligned with the entrance of the funnel-shaped space 12a. Thus, with respect to a portion of originally existing light lost in the funnel-shaped space 12a, the reference mode is converted into the first order mode, and the portion of the light is propagated through the optical fiber 10R.

Figure 13:
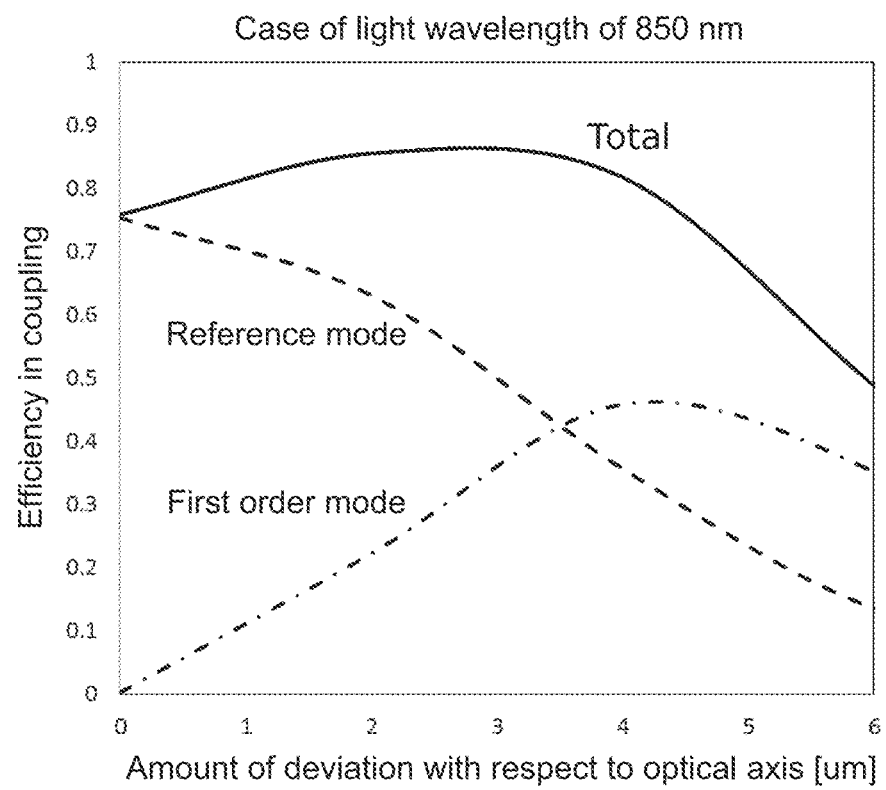
FIG. 13 is a graph describing the fact that the reference mode is converted into the first order mode according to the deviation.

In a graph of FIG. 13, a component of a reference mode (zero order mode) and a component of a first order mode are separately given, and the sum of them is represented by a curve Total. It is understood that a portion of the reference mode is converted into the first order mode according to the deviation since there is only the reference mode for input light. On the other hand, in the case of 1310 nm, there is a simple reduction in reference mode, as illustrated in FIG. 12, since propagation is performed only in the reference mode, as illustrated in FIG. 5A.

The case of 1310 nm and the case of 850 nm are compared with reference to FIG. 12. At a point in which the amount of a deviation with respect to an optical axis is 2 µm, the efficiency in coupling is about 1.3 times higher in the case of 850 nm than in the case of 1310 nm, and at a point in which the amount of a deviation with respect to an optical axis is 4 µm, the efficiency in coupling is about 1.86 times higher in the case of 850 nm than in the case of 1310 nm. This shows that the use of light of a wavelength of 850 nm makes it possible to relax the accuracy.

The result of FIG. 12 described above shows that the use of light of a wavelength of 850 nm also makes it possible to reduce a loss caused due to a deviation with respect to an optical axis if the focal point is not at the entrance end of the optical fiber 10R and is shifted in a direction of the optical axis.

[Transmission-and-Reception System]

Figure 14:
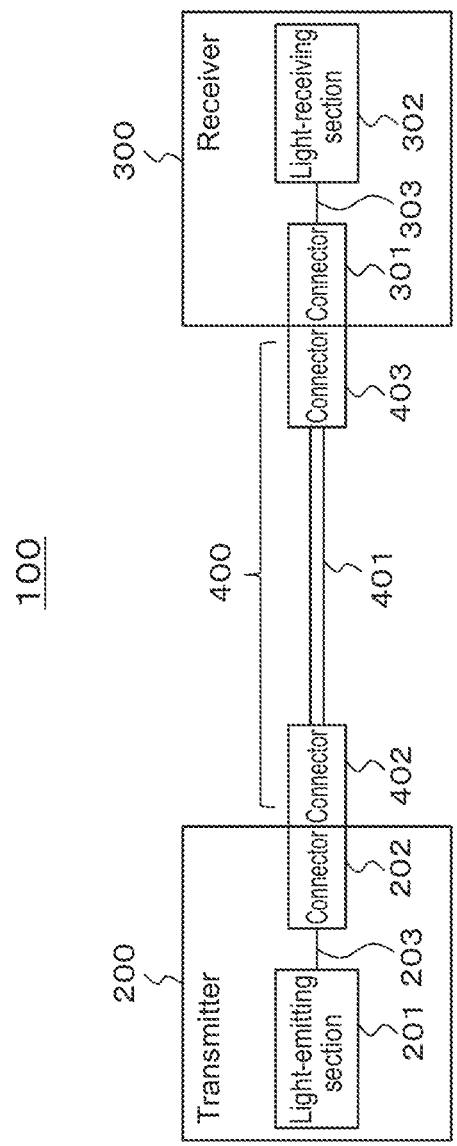
FIG. 14 is a block diagram illustrating an example of a configuration of a transmission-and-reception system according to embodiments.

FIG. 14 illustrates a transmission-and-reception system 100 according to the embodiments. The transmission-and-reception system 100 includes a transmitter 200, a receiver 300, and a cable 400. Examples of the transmitter 200 include AV sources such as a personal computer, a game machine, a disc player, a set-top box, a digital camera, and a cellular phone. Examples of the receiver 300 include a television receiver and a projector. The transmitter 200 and the receiver 300 are connected to each other through the cable 400.

The transmitter 200 includes a light-emitting section 201, a connector 202 that serves as a receptacle, and an optical fiber 203 that propagates, to the connector 202, light emitted by the light-emitting section 201. The light-emitting section 102 includes a laser element such as a vertical-cavity surface-emitting laser (VCSEL), or a light-emitting element such as a light-emitting diode (LED). The light-emitting section 201 converts, into an optical signal, an electric signal (a transmission signal) generated by a transmission circuit (not illustrated). The optical signal emitted by the light-emitting section 201 is propagated to the connector 202 through the optical fiber 203.

Further, the receiver 300 includes a connector 301 that serves as a receptacle, a light-receiving section 302, and an optical fiber 303 that propagates, to the light-receiving section 302, light obtained by the connector 301. The light-receiving section 302 includes a light-receiving element such as a photodiode. The light-receiving section 302 converts, into an electric signal (a reception signal), an optical signal transmitted from the connector 301, and supplies the electric signal to a reception circuit (not illustrated).

The cable 400 includes an optical fiber 401, and connectors 402 and 403 that are respectively situated at one end of the optical fiber 401 and at the other end of the optical fiber 401, the connectors 402 and 403 each serving as a plug. The connector 402 at one end of the optical fiber 401 is connected to the connector 202 of the transmitter 200, and the connector 403 at the other end of the optical fiber 401 is connected to the connector 301 of the receiver 300.

In the embodiments, the optical fiber 203 of the transmitter 200, the optical fiber 303 of the receiver 300, and the optical fiber 401 of the cable 400 perform propagation only in a reference mode at a first wavelength. Further, these optical fibers are configured such that the wavelength dispersion is zero at the first wavelength. For example, settings are performed such that the first wavelength is 1310 nm, and such that the core diameter d is 8 μm and the numerical aperture NA is 0.1, which respectively represent typical parameters for a 1310 nm optical fiber. This results in the normalized frequency V=1.92. Thus, these optical fibers serve as a single-mode fiber at a wavelength of 1310 nm (refer to FIGS. 5A and 5B).

Further, in the embodiments, these optical fibers perform communication using light of a second wavelength that can propagate in at least the first order mode in addition to the reference mode. Specifically, the second wavelength is 850 nm. When light of 850 nm is used, the normalized frequency V=2.96 in these optical fibers. Thus, the optical fibers can perform propagation in the first order mode in addition to the reference mode, and they serve as a double-mode fiber (refer to FIGS. 6A and 6B).

In the transmitter 200, light of 850 nm that is emitted by the light-emitting section 201 enters the optical fiber 203, which is a 1310 nm single-mode fiber, and is propagated to the connector 202. In this case, when the light entering the optical fiber 203 deviates with respect to an optical axis, propagation is performed in a first order mode in addition to a reference mode, the first order mode being generated due to the deviation with respect to the optical axis. This results in a reduction in a loss of coupling of optical power. This makes it possible to relax the accuracy with respect to a positional deviation, and thus to reduce costs.

Further, in a portion of connection between the connector 202 of the transmitter 200 and the connector 402 of the cable 400, a light path adjusting member (corresponding to the light path adjusting member 12R of FIGS. 7A and 7B) is arranged in the connector 402 on an entrance side of the optical fiber 401. The light of 850 nm exiting the connector 202 enters, through the light path adjusting member, the optical fiber 401, which is a 1310 nm single-mode fiber, and is propagated to the receiver 300.

In this case, input light that is not headed for the entrance end of the optical fiber 401 of the connector 402 from the connector 202 is guided to the entrance end of the optical fiber 401 due to the light path adjusting member adjusting a path of the light. Here, the angle of incidence with which transmission can be performed by the optical fiber 401, is made larger by using light of a wavelength of 850 nm, compared to the use of light of a wavelength of 1310 nm. This results in a reduction in a loss of coupling of optical power. Further, in this case, when the light entering the optical fiber 401 deviates with respect to an optical axis, propagation is performed in the first order mode in addition to the reference mode, the first order mode being generated due to the deviation with respect to the optical axis. This results in a reduction in a loss of coupling of optical power. This makes it possible to relax the accuracy with respect to a positional deviation, and thus to reduce costs.

Furthermore, in a portion of connection between the connector 403 of the cable 400 and the connector 301 of the receiver 300, a light path adjusting member (corresponding to the light path adjusting member 12R of FIGS. 7A and 7B) is arranged in the connector 301 on an entrance side of the optical fiber 303. The light of 850 nm exiting the connector 403 enters, through the light path adjusting member, the optical fiber 303, which is a 1310 nm single-mode fiber, and is propagated to the light-receiving section 302.

In this case, input light that is not headed for the entrance end of the optical fiber 303 of the connector 301 from the connector 403 is guided to the entrance end of the optical fiber 303 due to the light path adjusting member adjusting a path of the light. Here, the angle of incidence with which transmission can be performed by the optical fiber 401, is made larger by using light of a wavelength of 850 nm, compared to the use of light of a wavelength of 1310 nm. This results in a reduction in a loss of coupling of optical power. Further, in this case, when the light entering the optical fiber 303 deviates with respect to an optical axis, propagation is performed in the first order mode in addition to the reference mode, the first order mode being generated due to the deviation with respect to the optical axis. This results in a reduction in a loss of coupling of optical power. This makes it possible to relax the accuracy with respect to a positional deviation, and thus to reduce costs.

Figure 15:
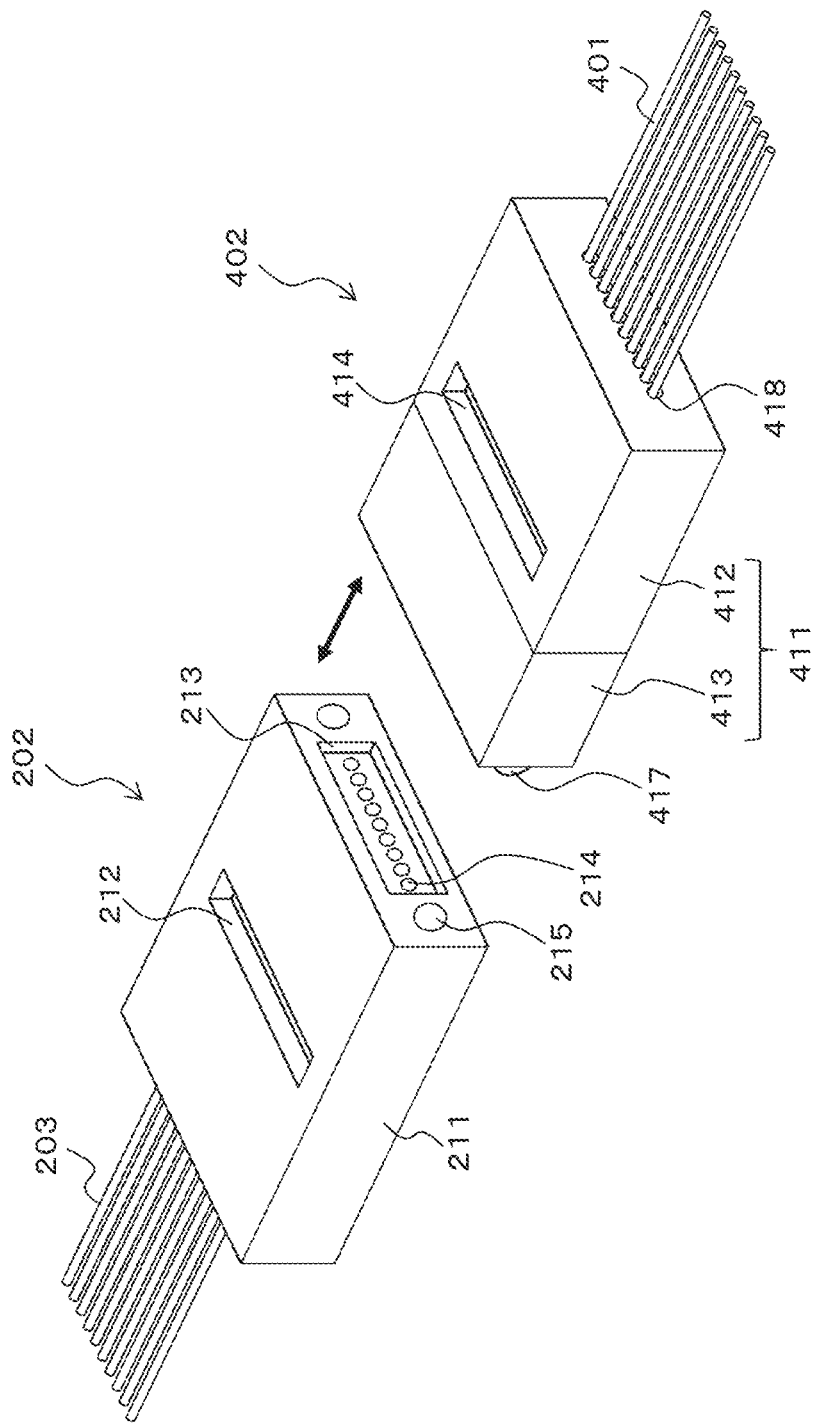
FIG. 15 is a perspective view illustrating an example of a configuration of a connector of a transmitter and a connector of a cable.
Figure 16:
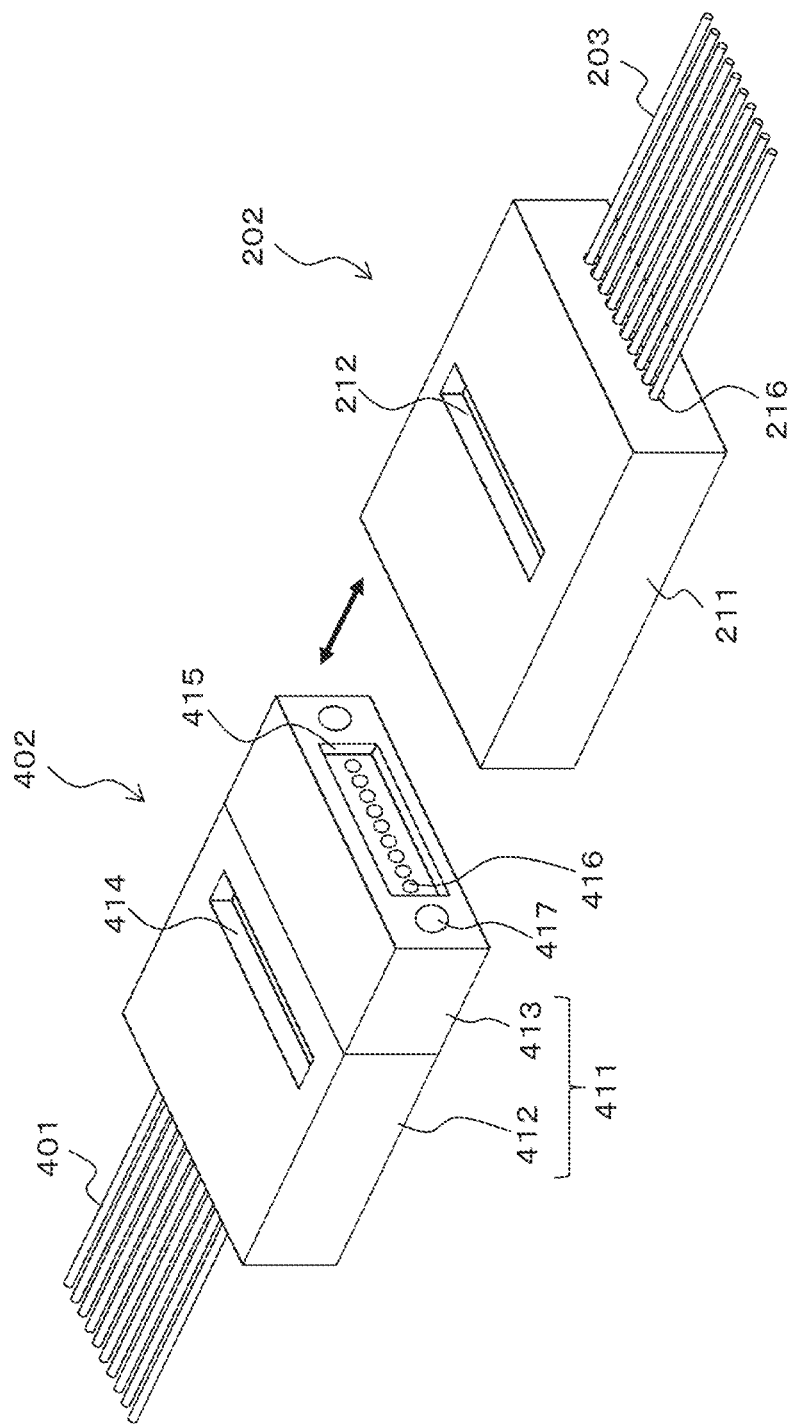
FIG. 16 is a perspective view illustrating the example of the configuration of the connector of the transmitter and the connector of the cable.

FIG. 15 is a perspective view illustrating an example of a configuration of the connector 202 of the transmitter 200 and the connector 402 of the cable 400. FIG. 16 is also a perspective view illustrating the example of the configuration of the connector 202 of the transmitter 200 and the connector 402 of the cable 400, as viewed from a direction opposite to a direction from which the configuration is viewed in FIG. 15. The illustrated example meets a parallel transmission of optical signals of a plurality of channels. Note that the configuration that meets a parallel transmission of optical signals of a plurality of channels is illustrated here, but it is also possible to provide a configuration that meets a transmission of an optical signal of a channel, although a detailed description thereof is omitted.

The connector 202 has a connector body (a ferrule) 211 of which an appearance has a shape of a substantially rectangular parallelepiped. A plurality of horizontally arranged optical fibers 203 respectively corresponding to channels is connected on the side of a rear face of the connector body 211. Ends of the respective optical fibers 203 are respectively inserted into optical fiber inserting holes 216 to fix the optical fibers 203.

Further, an adhesive injection hole 212 that includes a rectangular opening is formed on the side of an upper face of the connector body 211. An adhesive used to fix the optical fiber 203 to the connector body 211 is injected through the adhesive injection hole 212.

Furthermore, a concave light exit portion (a light transmission space) 213 that includes a rectangular opening is formed on the side of a front face of the connector body 211, and a plurality of horizontally arranged lenses (convex lenses) 214 respectively corresponding to channels is formed in a bottom portion of the light exit portion 213. This prevents the surface of the lens 214 from unintendedly coming into contact with, for example, a counterpart connector and from being damaged.

Moreover, a convex or concave position regulator 215 used to align the connector 202 with the connector 402 is integrally formed on the side of the front face of the connector body 211, where the position regulator 215 is concave in the illustrated example. This makes it possible to easily perform an optical-axis alignment when the connector 202 is connected to the connector 402.

The optical connector 402 includes a connector body 411 of which an appearance has a shape of a substantially rectangular parallelepiped. The connector body 411 includes a first optical section (ferrule) 412 and a second optical section 413 that are connected to each other. As described above, the connector body 411 includes the first and second optical sections 412 and 413, and this makes it possible to easily perform, for example, a production of a funnel-shaped space of a light path adjusting member, although such a funnel-shaped space is not illustrated in FIGS. 15 and 16.

A plurality of horizontally arranged optical fibers 401 respectively corresponding to channels is connected on the side of a rear face of the first optical section 412. In this case, ends of the respective optical fibers 401 are respectively inserted into optical fiber inserting holes 418 to fix the optical fibers 401. Further, an adhesive injection hole 414 that includes a rectangular opening is formed on the side of an upper face of the first optical section 412. An adhesive used to fix the optical fiber 401 to the first optical section 412 is injected through the adhesive injection hole 414.

Here, the first optical section 412 also includes the light path adjusting member described above. A funnel-shaped space corresponding to a position, in the first optical section 412, at which the optical fiber 401 for each channel is inserted is formed on the side of a front face of the first optical section 412, although this is not illustrated in FIGS. 15 and 16.

A concave light entrance portion (a light transmission space) 415 that includes a rectangular opening is formed on the side of a front face of the second optical section 413, and a plurality of horizontally arranged lenses (convex lenses) 416 respectively corresponding to channels is formed in a bottom portion of the light entrance portion 415. This prevents the surface of the lens 416 from unintendedly coming into contact with, for example, a counterpart connector and from being damaged.

Further, a concave or convex position regulator 417 used to align the connector 402 with the connector 202 is integrally formed on the side of the front face of the second optical section 413, where the position regulator 417 is convex in the illustrated example. This makes it possible to easily perform an optical-axis alignment when the connector 402 is connected to the connector 202. Note that the position regulator 417 is not limited to being formed integrally with the second optical section 413, and the formation may be performed using a pin or by another method.

Figure 17A:
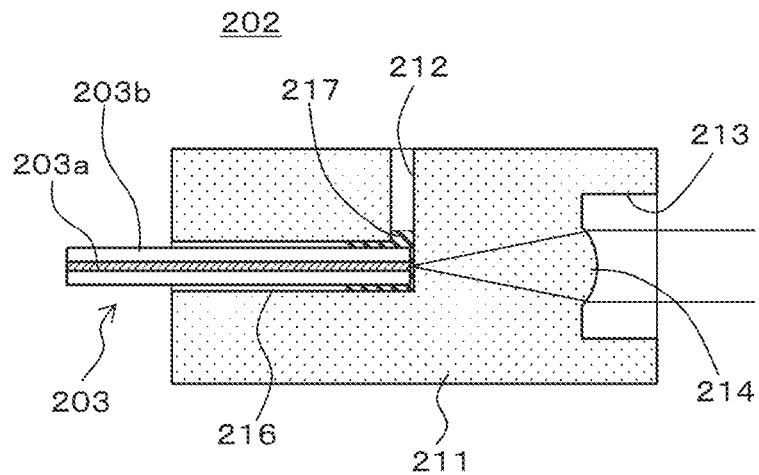
FIGS. 17A and 17B is a are set of cross-sectional views illustrating examples of the connector of the transmitter and the connector of the cable.

FIG. 17A is a cross-sectional view illustrating an example of the connector 202 of the transmitter 200. An illustration of the position regulator 215 (refer to FIG. 15) is omitted in the illustrated example. The connector 202 is further described with reference to FIG. 17A.

The connector 202 includes the connector body 211. The connector body 211 is made of, for example, a light-transmissive material such as synthetic resin or glass, or a material, such as silicon, through which a specific wavelength is transmitted, and the connector body 211 is in the form of a ferrule with a lens.

It is possible to easily align an optical fiber with a lens with respect to an optical axis when the connector body 211 is in the form of a ferrule with a lens, as described above. Further, when the connector body 211 is in the form of a ferrule with a lens, as described above, a multichannel communication can be easily performed just by inserting an optical fiber into a ferrule.

The concave light exit portion (the light transmission space) 213 is formed on the side of the front face of the connector body 211. Further, the plurality of horizontally arranged lenses (convex lenses) 214 respectively corresponding to channels is formed integrally with the connector body 211 to be situated in the bottom portion of the light exit portion 213.

Further, a plurality of optical fiber inserting holes 216 horizontally arranged correspondingly to the lenses 214 for the respective channels is provided to the connector body 211, each optical fiber inserting hole 214 extending forward from the side of the rear face of the connector body 211. The optical fiber 203 has a two-layer structure including a core 203a and cladding 203b, the core 203a being a center portion that serves as a light path, the cladding 203b covering a peripheral surface of the core 203a.

The optical fiber inserting hole 216 for each channel is formed such that the core 201a of the optical fiber 203 inserted into the optical fiber inserting hole 216 coincides the optical axis of a corresponding lens 214. Further, the optical fiber inserting hole 216 for each channel is formed such that a bottom of the optical fiber inserting hole 216, that is, a contact portion of the optical fiber inserting hole 216 coincides a focal point of the lens 214, the contact portion of the optical fiber inserting hole 216 being a portion with which the end (an entrance end) of the optical fiber 203 is brought into contact when the optical fiber 203 is inserted into the optical fiber inserting hole 216.

Further, the adhesive injection hole 212 extending downward from the side of the upper face of the connector body 211 is formed in the connector body 211 such that the adhesive injection hole 212 communicates with a portion situated around the bottoms of the plurality of horizontally arranged optical fiber inserting holes 216. After the optical fiber 203 is inserted into the optical fiber inserting hole 216, an adhesive 217 is injected into a portion situated around the optical fiber 203 through the adhesive injection hole 212. This results in fixing the optical fiber 203 to the connector body 211.

In the connector 202 of the transmitter 200, the lens 214 operates to form light exiting the optical fiber 203 into collimated light and to cause the collimated light to exit. Accordingly, light that exits the exit end of the optical fiber 203 enters the lens 214, and is formed into collimated light, and then the collimated light exits the lens 214.

Figure 17B:
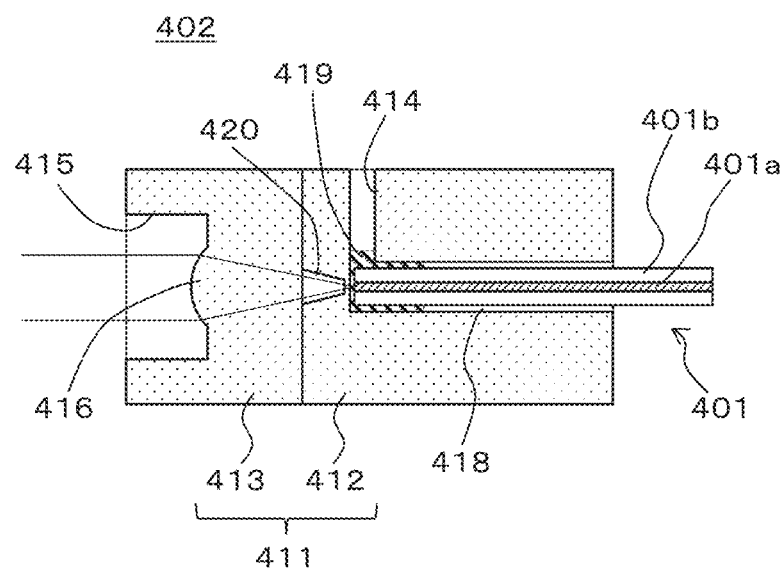

FIG. 17B is a cross-sectional view illustrating an example of the connector 402 of the cable 400. An illustration of the position regulator 417 (refer to FIGS. 15 and 16) is omitted in the illustrated example. The connector 402 is further described with reference to FIG. 17B.

The connector 402 includes the connector body 411 including the first optical section 412 and the second optical section 413 being connected to each other.

The second optical section 413 is made of, for example, a light-transmissive material such as synthetic resin or glass, or a material, such as silicon, through which a specific wavelength is transmitted. The connector body 411 is configured by the second optical section 413 being connected to the first optical section 412. It is favorable that the second optical section 413 be made of the same material as the first optical section 412 since the misalignment of a light path due to the two optical sections being distorted when there is a thermal change, can be prevented by the two optical sections having the same coefficient of thermal expansion. However, the second optical section 413 may be made of a material different from the material of the first optical section 412.

The concave light entrance portion (the light transmission space) 415 is formed on the side of the front face of the second optical section 413. Further, the plurality of horizontally arranged lenses 416 respectively corresponding to channels is formed integrally with the second optical section 413 to be situated in the bottom portion of the light entrance portion 415. Accordingly, the accuracy in positioning the lens 416 with respect to the second optical section 413 can be improved.

The first optical section 412 is made of, for example, a light-transmissive material such as synthetic resin or glass, or a material, such as silicon, through which a specific wavelength is transmitted, and the first optical section 412 is in the form of a ferrule. Accordingly, a multichannel communication can be easily performed just by inserting the optical fiber 401 into the ferrule.

Further, a plurality of horizontally arranged optical fiber inserting holes 418 is provided to the first optical section 412, each optical fiber inserting hole 418 extending forward from the side of the rear face of the first optical section 412. The optical fiber 401 has a two-layer structure including a core 401a and cladding 401b, the core 401a being a center portion that serves as a light path, the cladding 401b covering a peripheral surface of the core 401a.

The optical fiber inserting hole 418 for each channel is formed such that the core 401a of the optical fiber 401 inserted into the optical fiber inserting hole 418 coincides the optical axis of a corresponding lens 416. Further, the optical fiber inserting hole 418 for each channel is formed such that a bottom of the optical fiber inserting hole 418, that is, a contact portion of the optical fiber inserting hole 418 coincides a focal point of the lens 416, the contact portion of the optical fiber inserting hole 418 being a portion with which the end (an exit end) of the optical fiber 401 is brought into contact when the optical fiber 401 is inserted into the optical fiber inserting hole 418.

Further, the adhesive injection hole 414 extending downward from the side of the upper face of the first optical section 412 is formed in the first optical section 412 such that the adhesive injection hole 414 communicates with a portion situated around the bottoms of the plurality of horizontally arranged optical fiber inserting holes 418. After the optical fiber 401 is inserted into the optical fiber inserting hole 418, an adhesive 419 is injected into a portion situated around the optical fiber 401 through the adhesive injection hole 414. This results in fixing the optical fiber 401 to the first optical section 412.

Further, the first optical section 412 also includes a light path adjusting member. A plurality of funnel-shaped spaces 420 is formed on the side of the front face of the first optical section 412, each funnel-shaped space 420 corresponding to a position, in the first optical section 412, at which the optical fiber 401 for a corresponding channel is inserted.

As described above, the connector body 411 is configured by the first optical section 412 and the second optical section 413 being connected to each other. For example, a method including newly forming a concave portion such as a boss in one of the two optical sections, newly forming a convex portion in the other optical section, and then performing fitting; or a method including aligning optical axes of lenses using, for example, an image processing system, and then performing bonding and fixation may be adopted as a method for the connection described above.

In the connector 402 of the cable 400, the lens 416 operates to collect entering collimated light. In this case, the collimated light enters the lens 416, and is collected by the lens 416. The collected light enters the entrance end of the optical fiber 401 through the funnel-shaped space 420.

Figure 18:
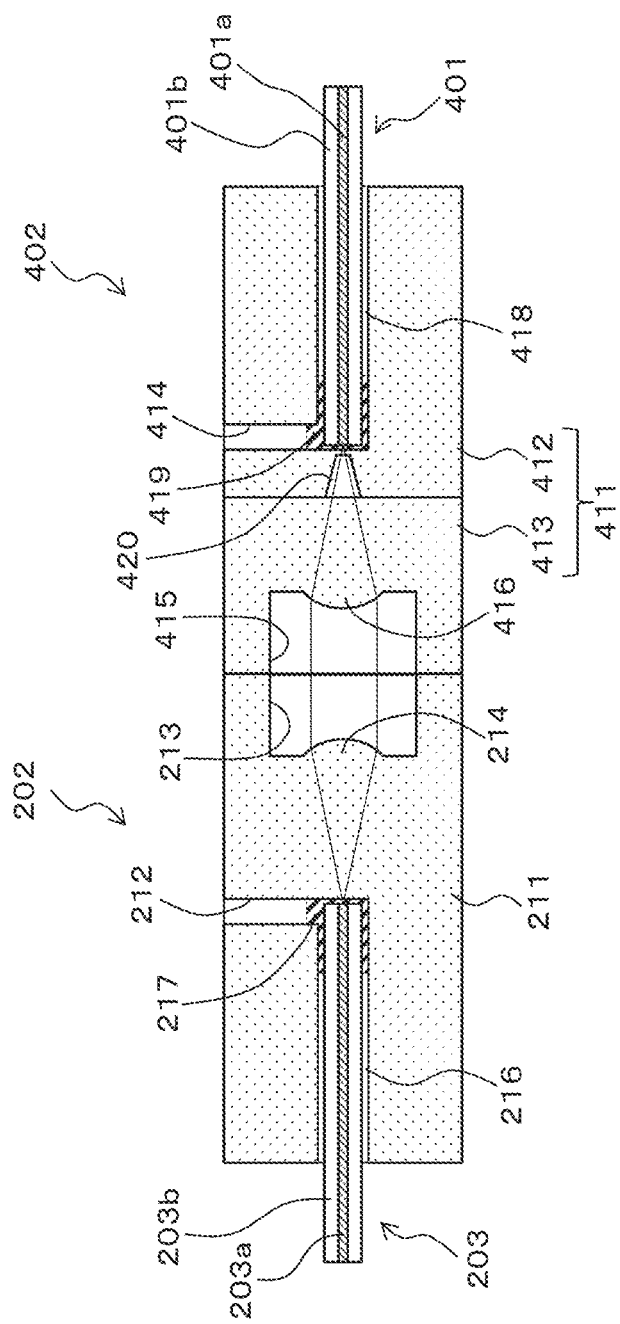
FIG. 18 is a cross-sectional view illustrating the connector of the transmitter and the connector of the cable being connected to each other.

FIG. 18 is a cross-sectional view illustrating the connector 202 of the transmitter 200 and the connector 402 of the cable 400 being connected to each other. In the connector 202, light transmitted through the optical fiber 203 exits the exit end of the optical fiber 203 with a specified NA. The exiting light enters the lens 214, and is formed into collimated light. The collimated light exits the lens 214 toward the connector 402.

Further, in the connector 402, the light exiting the connector 202 enters the lens 416, and is collected by the lens 416. Then, the collected light enters the entrance end of the optical fiber 401 through the funnel-shaped space 402, and is transmitted through the optical fiber 401.

Note that the connector 403 of the cable 400 and the connector 301 of the receiver 300 have a configuration similar to the above-described example of the configuration of the connector 202 of the transmitter 200 and the connector 402 of the cable 400, although a detailed description thereof is omitted.

Figure 19:
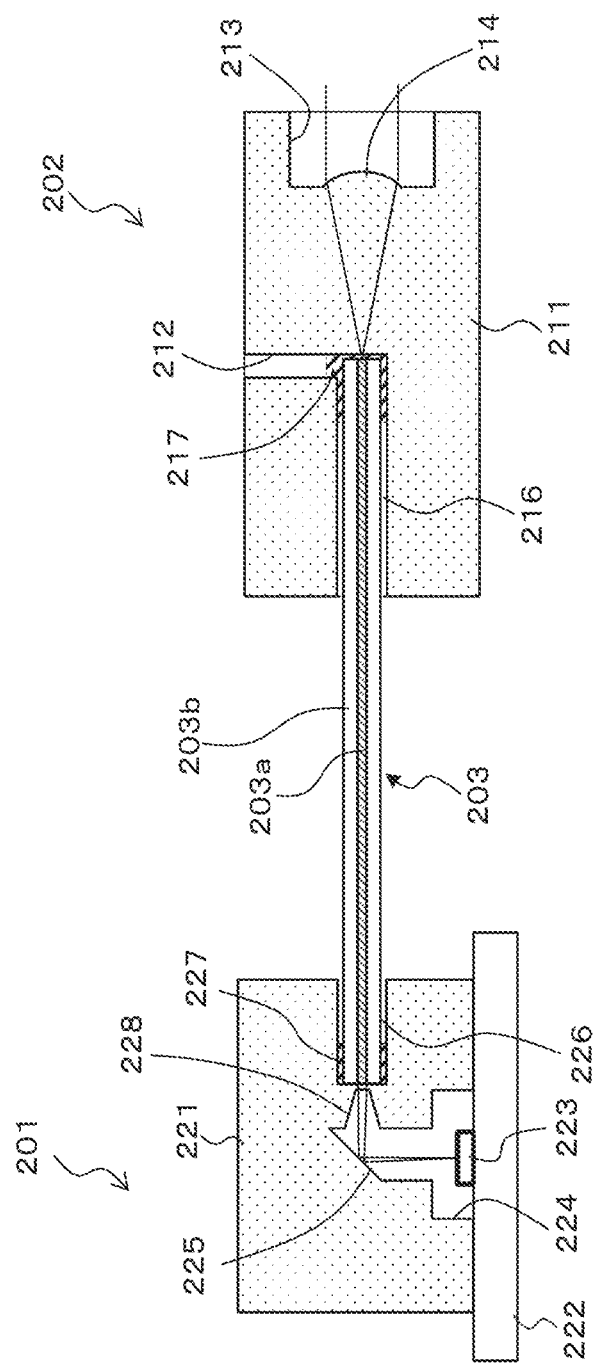
FIG. 19 is a cross-sectional view illustrating an example of a configuration of a light-emitting section and the connector that are included in the transmitter.

FIG. 19 illustrates an example of a configuration of the light-emitting section 201 and the connector 202 that are included in the transmitter 200. As described above, the transmitter 200 meets a parallel transmission of optical signals of a plurality of channels. The figure only illustrates an example of a configuration of one channel.

The light-emitting section 201 includes a ferrule 221. The ferrule 221 is made of, for example, a light-transmissive material such as synthetic resin or glass, or a material, such as silicon, through which a specific wavelength is transmitted.

A plurality of horizontally arranged optical fiber inserting holes 226 each extending rearward from the side of a front face of the ferrule 221 is provided to the ferrule 221. After the optical fiber 203 for each channel is inserted into the optical fiber inserting hole 226, the optical fiber 203 is fixed to the ferrule 221 using an adhesive 227.

Further, a substrate 222 on which a light-emitting element 223 is placed is fixed on the side of a lower face of the ferrule 221. In this case, a plurality of light-emitting elements 223 horizontally arranged correspondingly to the optical fibers 203 for the respective channels is placed on the substrate 222. Here, the position of the substrate 222 is adjusted and the substrate 222 is fixed, such that an exit portion of the light-emitting element 223 for each channel coincides the optical axis of a corresponding optical fiber 203.

Further, a light-emitting-element arranging hole 224 extending upward from the side of the lower face is formed in the ferrule 221. Further, a bottom portion of the light-emitting-element arranging hole 224 includes an inclined surface in order to change, to a direction of a corresponding optical fiber 203, the direction of a path of light coming from the light-emitting element 223 for each channel, and a mirror (a light path changing portion) 225 is arranged on the inclined surface. Note that the mirror 225 is not limited to being separately generated and being fixed on the inclined surface, and the mirror 225 may be formed on the inclined surface by, for example, vapor deposition.

Further, on the side of the front face of the ferrule 221, a plurality of funnel-shaped spaces 228 is formed correspondingly to the entrance end of the optical fiber 203 for each channel. The large-diameter side of the funnel-shaped space 228 faces a side surface of the light-emitting-element arranging hole 224.

The configuration of the connector 202 is similar to its configuration described above with reference to FIG. 17A. Thus, the description thereof is omitted here.

In the light-emitting section 201, light that exits the exit portion of the light-emitting element 223 with a specified NA enters an entrance end of the optical fiber 203 through the funnel-shaped space 228 after a path of the light is changed by the mirror 225. The light entering the optical fiber 203 is transmitted to the connector 202 through the optical fiber 203. Then, in the connector 202, the light transmitted through the optical fiber 203 exits the exit end of the optical fiber 203 with a specified NA. The exiting light enters the lens 214, and is formed into collimated light, and the collimated light exits the lens 214.

In the transmission-and-reception system 100 illustrated in FIG. 14, the connectors 402 and 301 are respectively provided with light path adjusting members used to guide input light to the respective entrance ends of the optical fibers 401 and 303. Thus, when there is a positional deviation, input light that is not headed for the entrance end of the optical fiber 401,303 is guided to the entrance end of the optical fiber 401,303 due to the light path adjusting member adjusting a path of the light. This results in a reduction in a loss of coupling of optical power.

Further, the optical fibers 401, 303, and 203 in the transmission-and-reception system 100 illustrated in FIG. 14 are 1310 nm single-mode fibers, and communication is performed using light of 850 nm. Thus, the optical fibers 401, 303, and 203 can perform propagation in a first order mode in addition to a reference mode, and they serve as a double-mode fiber (refer to FIGS. 6A and 6B).

Thus, when there is a positional deviation, propagation is performed by the optical fibers 401 and 303 in at least a first order mode in addition to a reference mode, the at least the first order mode being generated due to input light being totally reflected off the wall of the funnel-shaped space 420 of the light path adjusting member. This results in a reduction in a loss of coupling of optical power. This makes it possible to relax the accuracy with respect to the positional deviation, and thus to reduce costs.

<2. Modifications>

Figure 20:
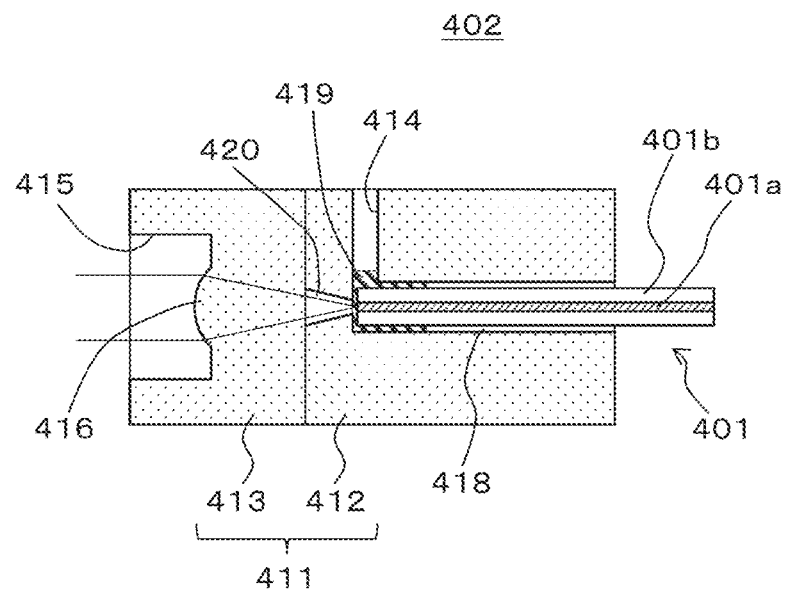
FIG. 20 illustrates an example in which the funnel-shaped space is a through-hole.

Note that the example in which the funnel-shaped space 420 includes a bottom portion, as illustrated in FIG. 17B, has been described in the embodiments described above. In order to avoid reflection of light onto the bottom portion, the funnel-shaped space 420 may be in the form of a through-hole, as illustrated in FIG. 20. In FIG. 20, a portion corresponding to a portion of FIG. 17B is denoted by the same reference numeral as the portion of FIG. 17B.

Figure 21:
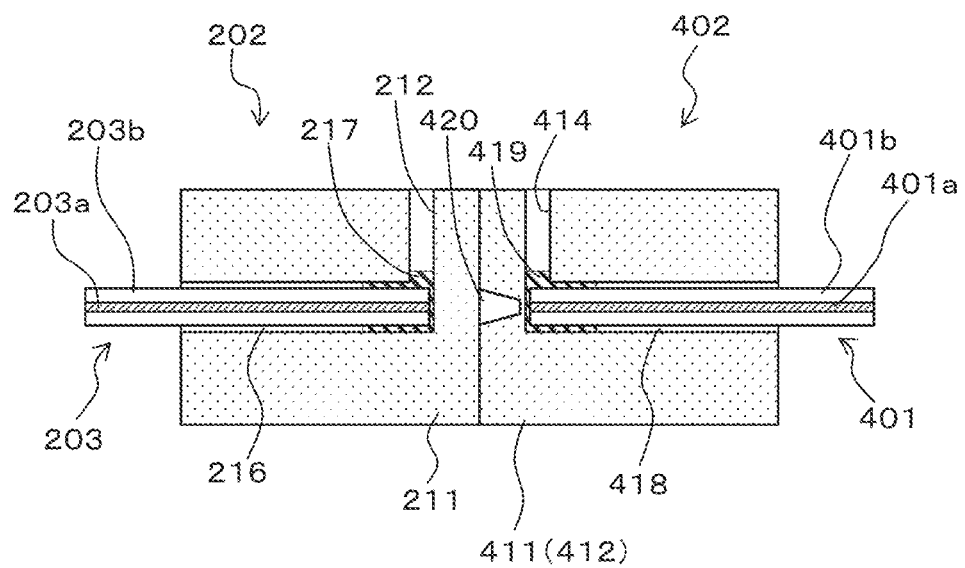
FIG. 21 illustrates an example of spatial coupling with no lens.

Further, the example of spatial coupling performed using lenses has been described in the embodiments described above. However, the present technology enables spatial coupling with no lens, as illustrated in FIG. 21. In FIG. 21, a portion corresponding to a portion of FIG. 18 is denoted by the same reference numeral as the portion of FIG. 18. In this case, no lens is formed in the connector body 211 included in the connector 202. Further, in this case, the connector 402 only includes the first optical section 412.

Figure 22A:
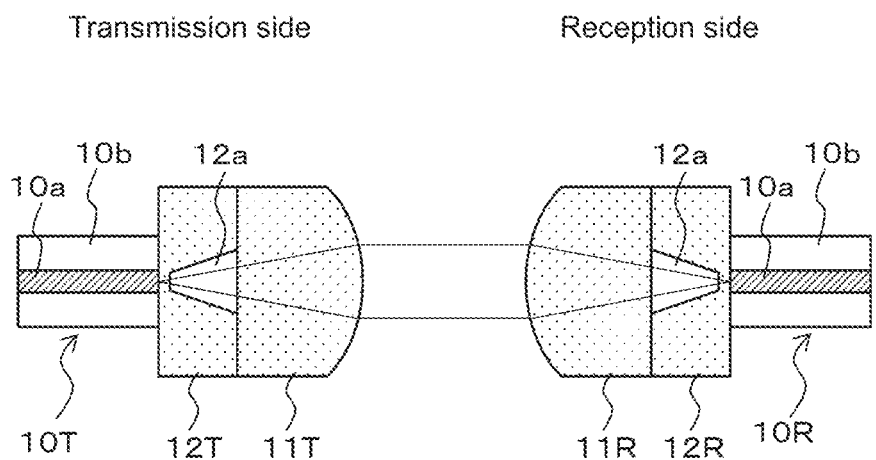
FIGS. 22A and 22B illustrate an example of arranging a light path adjusting member on an exit side of an optical fiber on the transmission side.
Figure 22B:
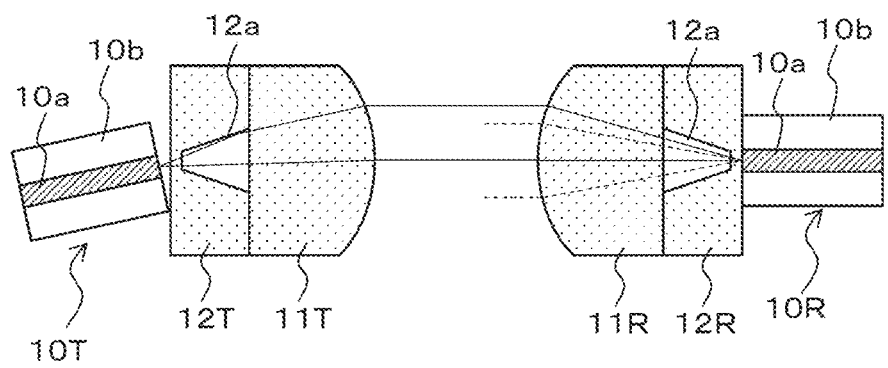

Further, as illustrated in FIGS. 22A and 22B, a light path adjusting member 12T that is similar to the light path adjusting member 12R on the reception side may also be arranged on an exit side of the optical fiber 10T on the transmission side, although this has not been described above. For example, as illustrated in the figure, the light path adjusting member 12T is a member that includes a portion having a shape of which the diameter is gradually decreased toward the exit side of the optical fiber 10T, that is, a member that includes the funnel-shaped space 12a.

Figure 23:
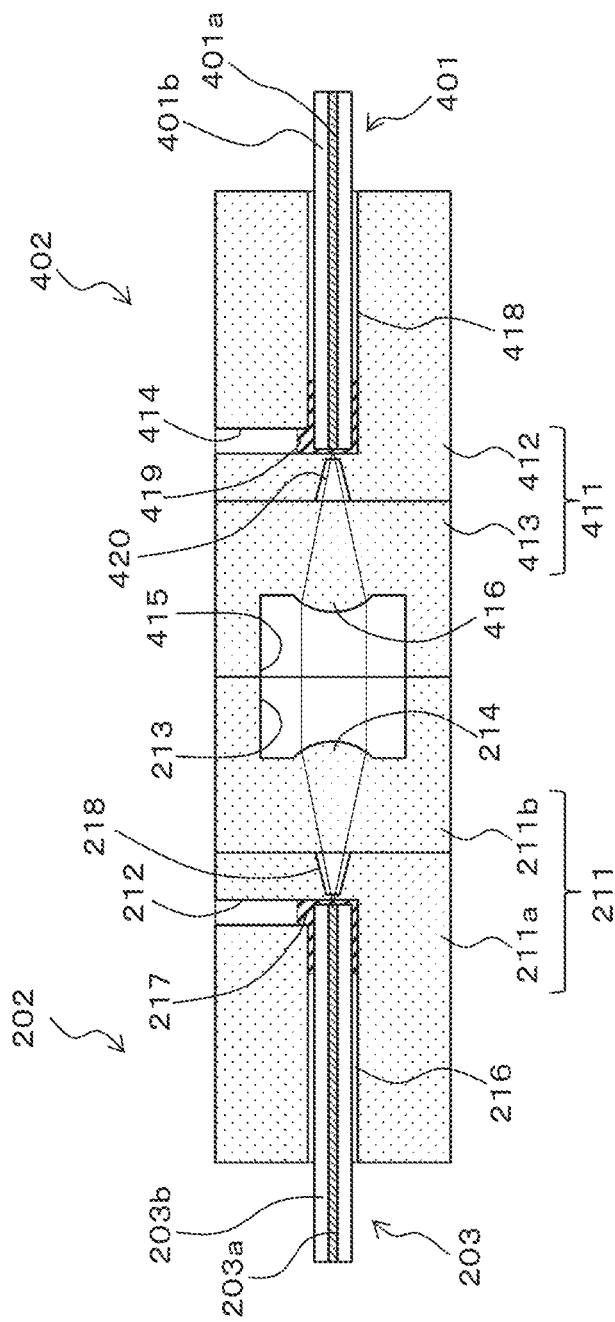
FIG. 23 illustrates an example of arranging the light path adjusting member on the exit side of the optical fiber on the transmission side.

In a configuration in which the angle of incidence of light on the reception side is equal to an angle of incidence determined by the NA of the optical fiber 10R, as illustrated in FIG. 22A, the provision of the light path adjusting member 12T on the transmission side enables light to be totally reflected off the funnel-shaped space 12a to be headed for the center again when the light significantly deviates from the center due to the optical fiber 10T on the transmission side being inclined, as illustrated in FIG. 22B. Further, in this case, light of which the angle of incidence exceeds the angle of incidence determined by the NA enters the reception side. However, the entering light is propagated through the optical fiber 10R in a first order mode, and this results in a reduction in loss. FIG. 23 further illustrates an example of providing a light path adjusting member on the transmission side with respect to the example illustrated in FIG. 18, although a detailed description thereof is omitted. In this case, the connector body 211 includes a first optical section 211a and a second optical section 211b. Further, the first optical portion 211a includes a light path adjusting member, and is provided with a funnel-shaped space 218.

Note that the example in which a light path adjuster that adjusts a light path such that input light is guided to a core of an optical waveguide, includes the light path adjusting member 12R provided on the entrance side of the optical fiber 10R, as illustrated in FIG. 24A, has been described in the embodiments described above (refer to FIGS. 3A and 3B). The light path adjusting member 12R is a member that includes the funnel-shaped space 12a including a tapered surface 12b in which the diameter of the funnel-shaped space 12a is gradually decreased toward the core 10a of the optical fiber 10R. Such a provision of the light path adjusting member 12R on the entrance side of the optical fiber 10R enables light to be reflected off the tapered surface 12b to be headed for the center corresponding to an optical axis again when the light deviates downward or upward from the optical axis in the figure.

The light path adjuster is not limited to including the light path adjusting member 12R, as described above, and other configurations may also be adopted. FIGS. 24B, 25A, 25B, 26A, and 27A illustrate other configurations of the light path adjuster.

An example of the configuration of (b) of FIG. 24B is described. This is an example of providing a light path adjusting member 13R on the entrance side of the optical fiber 10R. The light path adjusting member 13R includes a center portion 13R_1 and an outer peripheral portion 13R_2, the center portion 13R_1 including a tapered surface 13b in which the diameter of the center portion 13R_1 is gradually decreased toward the core 10a of the optical fiber 10R, the outer peripheral portion 13R_2 being situated around the center portion 13R_1. The center portion 13R_1 includes a member similar to the member of the core 10a of the optical fiber 10R, and the outer peripheral portion 13R_2 includes a member similar to the member of the cladding 10b of the optical fiber 10R. Note that the configuration in which the center portion 13R_1 and the outer peripheral portion 13R_2 respectively include members similar to the member of the core 10a and the member of the cladding 10b, has been described above, but they are not limited to such a configuration. The center portion 13R_1 and the outer peripheral portion 13R_2 may respectively include another member that serves a function similar to the function of the member of the core 10a, and another member that serves a function similar to the function of the member of the cladding 10b.

Such a provision of the light path adjusting member 13R on the entrance side of the optical fiber 10R enables light to be reflected off the tapered surface 13b to be headed for the center corresponding to an optical axis again when the light deviates downward or upward from the optical axis. Accordingly, the efficiency in coupling of optical power when there is a deviation with respect to an optical axis can be improved, as in the case of the example of providing the light path adjusting member 12R on the entrance side of the optical fiber 10R described above.

Figure 25A:
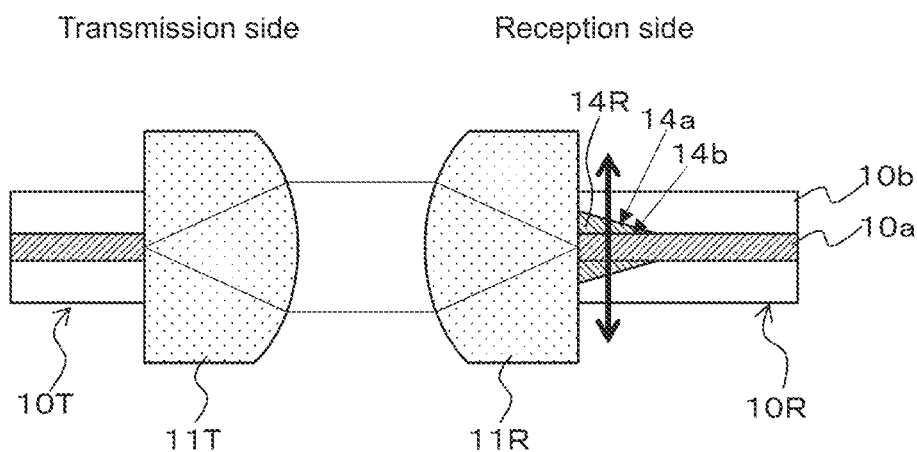
FIGS. 25A and 25B are diagrams for describing another example of the configuration of the light path adjuster.

An example of the configuration of FIG. 25A is described. This is an example of providing a light path adjusting member 14R between the core 10a and the cladding 10b at the entrance end of the optical fiber 10R. The light path adjusting member 14R includes a tapered surface 14a that is a surface in contact with the cladding 10b, and a cylindrical surface 14b that is a surface in contact with the core 10a, the tapered surface 14a being a surface in which the diameter of the light path adjusting member 14R is gradually decreased toward the core 10a. In the light path adjusting member 14R, the cylindrical surface 14b has the same refractive index as the core 10a, and the tapered surface 14a has the same refractive index as the cladding 10b. The light path adjusting member 14R has a so-called graded refractive index in which the refractive index gradually varies from the cylindrical surface 14b to the tapered surface 14a.

Such a provision of the light path adjusting member 14R between the core 10a and the cladding 10b at the entrance end of the optical fiber 10R enables light to be reflected off the light path adjusting member 14R including the tapered surface 14a to be headed for the center corresponding to an optical axis again when the light deviates downward from the optical axis. Accordingly, the efficiency in coupling of optical power when there is a deviation with respect to an optical axis can be improved, as in the case of the example of providing the light path adjusting member 12R on the entrance side of the optical fiber 10R described above.

Figure 25B:
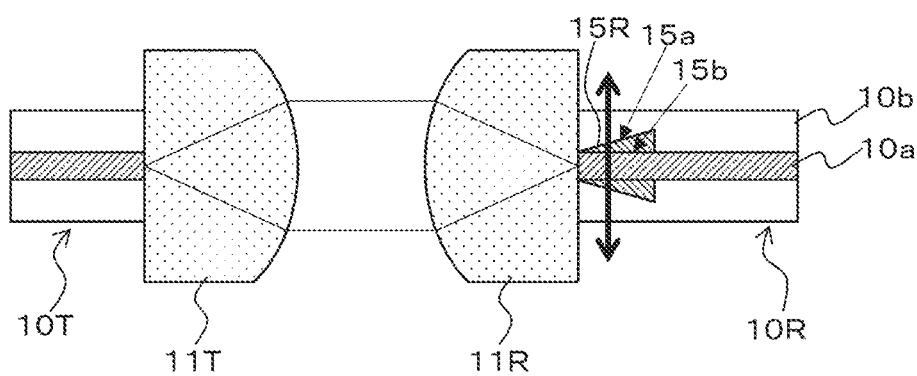

An example of the configuration of FIG. 25B is described. This is an example of providing a light path adjusting member 15R between the core 10a and the cladding 10b at the entrance end of the optical fiber 10R. The light path adjusting member 15R includes a tapered surface 15a that is a surface in contact with the cladding 10b, and a cylindrical surface 15b that is a surface in contact with the core 10a, the tapered surface 15a being a surface in which the diameter of the light path adjusting member 15R is gradually increased from the core 10a. In the light path adjusting member 15R, the cylindrical surface 15b has the same refractive index as the core 10a, and the tapered surface 15a has the same refractive index as the cladding 10b. The light path adjusting member 15R has a so-called graded refractive index in which the refractive index gradually varies from the cylindrical surface 15b to the tapered surface 15a.

Such a provision of the light path adjusting member 15R between the core 10a and the cladding 10b at the entrance end of the optical fiber 10R enables light to enter the tapered portion via the cladding 10 and thus to be coupled to the core 10a when the light deviates downward or upward from the optical axis. Accordingly, the efficiency in coupling of optical power when there is a deviation with respect to an optical axis can be improved, as in the case of the example of providing the light path adjusting member 12R on the entrance side of the optical fiber 10R described above.

Figure 26A:
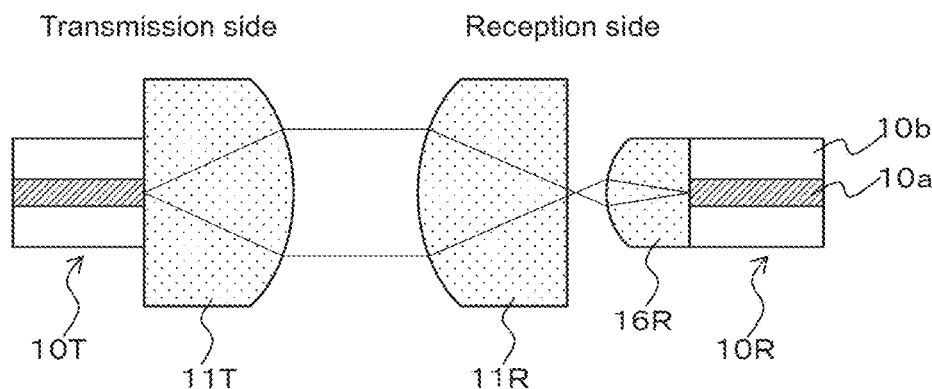
FIGS. 26A, 26B, and 26C are diagrams for describing another example of the configuration of the light path adjuster.

An example of the configuration of of FIG. 26A is described. This is an example of a double-lens system in which a lens (a convex lens) 16R is provided on the entrance side of the optical fiber 10R. Such a double-lens system makes it possible to easily convert a reference mode (zero order mode) into a first order mode when light deviates downward or upward from the optical axis. Accordingly, the efficiency in coupling of optical power when there is a deviation with respect to an optical axis can be improved, as in the case of the example of providing the light path adjusting member 12R on the entrance side of the optical fiber 10R described above.

Figure 26B:
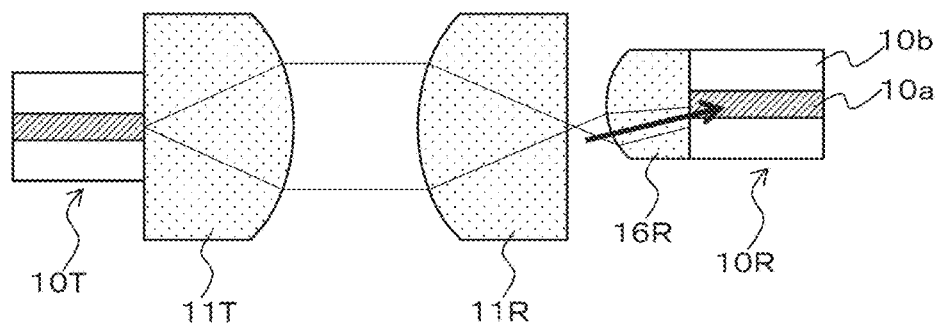
Figure 26C:
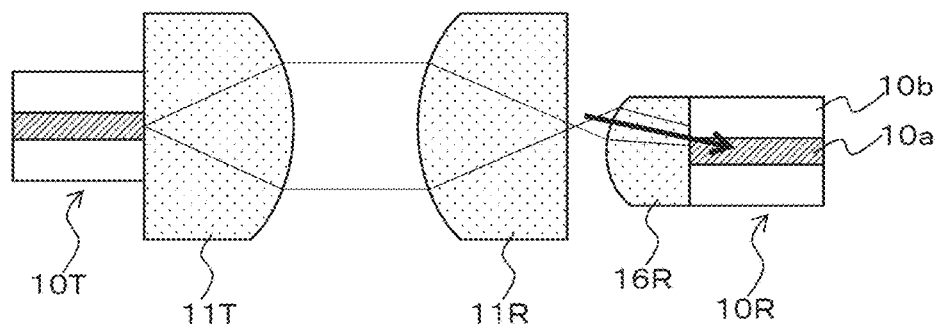

In this case, when the optical axis of an optical fiber with a lens deviates, as illustrated in FIGS. 26B and 26C, light passing through the lens 16R travels toward the core 10a of the optical fiber 10R. Thus, the light for which the mode has been converted from a reference mode (zero order mode) to a first order mode can be easily coupled to the core 10a via the cladding 10b. The application of the doble-lens system makes it possible to improve the efficiency in coupling.

Figure 27A:
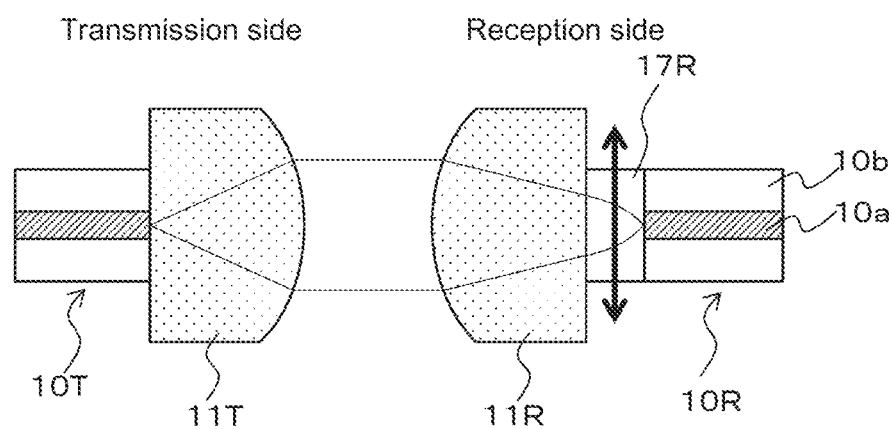
FIGS. 27A and 27B are diagrams for describing another example of the configuration of the light path adjuster.

An example of the configuration of FIG. 27A is described. This is an example of providing a light path adjusting member 17R on the entrance side of the optical fiber 10R. The light path adjusting member 17R is a member that has a refractive-index distribution. The light path adjusting member 17R has a refractive index having a gradation structure in which the light path adjusting member 17R has, on the optical axis, a refractive index equal to the refractive index of the core 10a of the optical fiber 10R, and the light path adjusting member 17R has a refractive index lower at a position, in the light path adjusting member 17R, that is situated vertically further away from the optical axis.

Figure 27B:
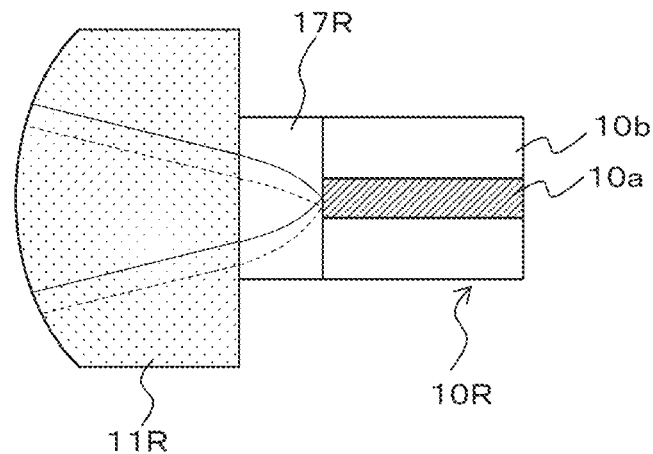

When the light path adjusting member 17R is provided on the entrance side of the optical fiber 10R, as described above, light entering the light path adjusting member 17R travels while being bent in a direction of an optical axis due to an effect provided by the gradation. Further, such a provision of the light path adjusting member 17R enables light to be headed for the center corresponding to an optical axis again when the light deviates from the optical axis. The following is the reason for that. When the light path deviates downward from the optical axis, as indicated by a dashed line of of FIG. 27B, light near the optical axis is less bent due to a small difference in refractive index, and light that deviates further from the optical axis is greatly bent due to a large difference in refractive index. Thus, light is concentrated on a portion around the center of the core 10a. Accordingly, the efficiency in coupling of optical power when there is a deviation with respect to an optical axis can be improved, as in the case of the example of providing the light path adjusting member 12R on the entrance side of the optical fiber 10R described above.

Figure 28:
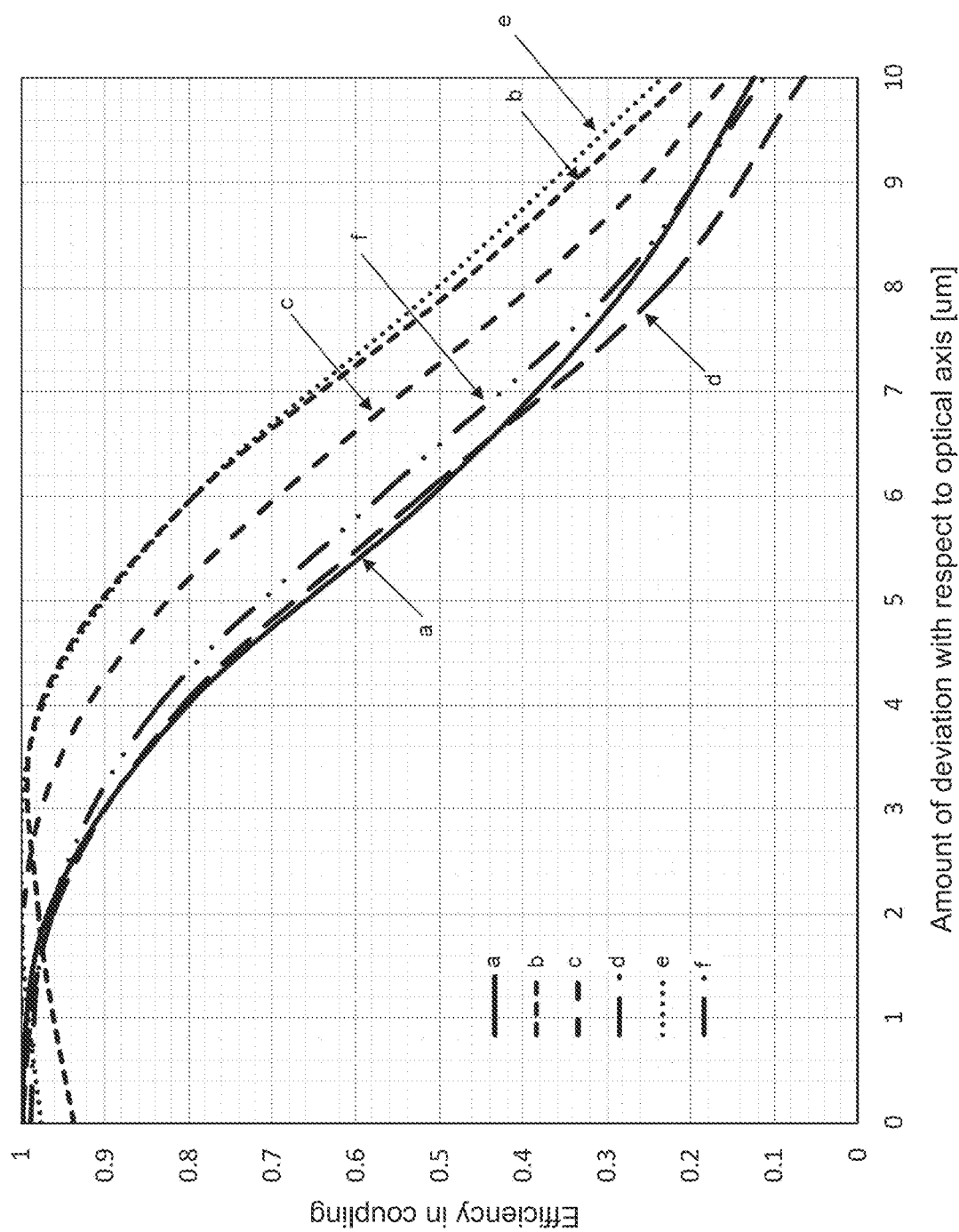

FIG. 28 is a graph of the efficiency in coupling of optical power when there is a deviation with respect to an optical axis, where curves a, b, c, d, e, and f respectively indicate the efficiencies in coupling of optical power when there is a deviation with respect to an optical axis in the respective examples of the configuration of FIGS. 24A, 24B, 25A, 25B, 26A, and 27A. For example, when comparison is performed at an efficiency in coupling of 0.9, amounts of a positional deviation in the examples of the configuration of FIGS. 24B, 25A, 25B, 26A, and 27A are equal to or greater than the amount of a positional deviation in the example of the configuration of FIG. 25A.

In this case, when the optical axis of an optical

Further, the example in which the first wavelength is 1310 nm has been described in the embodiments above. However, a laser light source or an LED light source may be used as a light source. Thus, the first wavelength may be a wavelength of, for example, between 300 nm and 5 μm.

Further, the first wavelength may be a wavelength in the 1310 nm band including 1310 nm, although the example in which the first wavelength is 1310 nm has been described in the embodiments above. Furthermore, the first wavelength may be 1550 nm, or may be a wavelength in the 1550 nm band including 1550 nm, although the example in which the first wavelength is 1310 nm has been described in the embodiments above. Moreover, the second wavelength may be a wavelength in the 850 nm band including 850 nm, although the example in which the second wavelength is 850 nm has been described in the embodiments above.

Further, of course, the present technology is also appliable when the optical waveguide is an optical waveguide other than an optical fiber such as a silicon optical waveguide, although the example in which the optical waveguide is an optical fiber has been described in the embodiments above.

The favorable embodiments of the present disclosure have been described above in detail with reference to the accompanying drawings. However, the technical scope of the present disclosure is not limited to these examples. It is clear that persons who have common knowledge in the technical field of the present disclosure could conceive various alternations or modifications within the scope of a technical idea according to an embodiment of the present disclosure. It is understood that of course such alternations or modifications also fall under the technical scope of the present disclosure.

Further, the effects described herein are not limitative, but are merely descriptive or illustrative. In other words, the technology according to the present disclosure may provide other effects apparent to those skilled in the art from the description herein, in addition to, or instead of the effects described above.

Note that the present technology may also take the following configurations.

(1) An optical communication apparatus, including:
an optical waveguide that performs propagation only in a reference mode at a first wavelength; and
a light path adjuster that adjusts a light path such that input light is guided to a core of the optical waveguide, the optical communication apparatus performing communication using light of a second wavelength that enables the optical waveguide to perform propagation in at least a first order mode in addition to the reference mode.

(2) The optical communication apparatus according to (1), in which
the light path adjuster adjusts the light path due to light being reflected off a light path adjusting member that includes a tapered surface in which a diameter is gradually decreased toward an entrance side of the optical waveguide.

(3) The optical communication apparatus according to (1), in which
the light path adjuster adjusts the light path due to light being refracted by a lens.

(4) The optical communication apparatus according to (1), in which
the light path adjuster is provided between the core and cladding at an entrance end of the optical waveguide, and
the light path adjuster adjusts the light path using a light path adjusting member that includes a surface in contact with the cladding, the surface being a surface in which a diameter sized equally to a diameter of the core is gradually increased, the light path adjusting member having a refractive index gradually varying in a direction from the core to the cladding, from a refractive index equal to a refractive index of the core to a refractive index equal to a refractive index of the cladding.

(5) The optical communication apparatus according to (1), in which
the light path adjuster is provided on an entrance side of the optical waveguide, and
the light path adjuster adjusts the light path using a light path adjusting member that has a refractive index having a gradation structure in which the light path adjusting member has, on an optical axis, a refractive index equal to a refractive index of the core of the optical waveguide, and the light path adjusting member has a refractive index lower at a position, in the light path adjusting member, that is situated vertically further away from the optical axis.

(6) The optical communication apparatus according to any one of (1) to (5), in which
the first wavelength is a wavelength at which a wavelength dispersion is zero.

(7) The optical communication apparatus according to any one of (1) to (6), in which
the first wavelength is a wavelength of between 300 nm and 5 μm.

(8) The optical communication apparatus according to (7), in which
the first wavelength is a wavelength in a 1310 nm band or a wavelength in a 1550 nm band.

(9) The optical communication apparatus according to any one of (1) to (8), in which
the second wavelength is a wavelength in an 850 nm band.

(10) The optical communication apparatus according to (1) to (9), in which
the optical waveguide is an optical fiber.

(11) The optical communication apparatus according to (1) to (9), in which
the optical waveguide is a silicon optical waveguide.

(12) An optical communication method that is performed by an optical communication apparatus that includes an optical waveguide and a light path adjuster, the optical waveguide performing propagation only in a reference mode at a first wavelength, the light path adjuster adjusting a light path such that input light is guided to a core of the optical waveguide, the optical communication method including
performing communication using light of a second wavelength that enables the optical waveguide to perform propagation in at least a first order mode in addition to the reference mode.

(13) An optical communication system, including:
a reception section that includes an optical waveguide and a light path adjuster, the optical waveguide performing propagation only in a reference mode at a first wavelength, the light path adjuster adjusting a light path such that input light is guided to a core of the optical waveguide; and
a transmission section from which light of a second wavelength enters the optical waveguide of the reception section through the light path adjuster, the second wavelength enabling the optical waveguide to perform propagation in at least a first order mode in addition to the reference mode.

(14) The optical communication system according to (13), in which
the transmission section is a light-emitting element, a receptacle of a transmitter, or a plug of a cable.

REFERENCE SIGNS LIST 100 transmission-and-reception system
200 transmitter
201 light-emitting section
202 connector (receptacle)
203 optical fiber
203a core
203b cladding
211 connector body
212 adhesive injection hole
213 light exit portion (light transmission space)
214 lens (convex lens)
215 position regulator
216 optical fiber inserting hole
217 adhesive
218 funnel-shaped space
221 ferrule
222 substrate
223 light-emitting element
224 light-emitting-element arranging hole
225 mirror
226 optical fiber inserting hole
227 adhesive
300 receiver
301 connector (receptacle)
302 light-receiving section
303 optical fiber
400 cable
401 optical fiber
401a core
401b cladding
402, 403 connector (plug)
411 connector body
412 first optical section
413 second optical section
414 adhesive injection hole
415 light entrance portion (light transmission space)
416 lens (convex lens)
417 position regulator
418 optical fiber inserting hole
419 adhesive
420 funnel-shaped space

The invention claimed is:

1. An optical communication apparatus, comprising:
an optical waveguide that is configured to perform propagation only in a reference mode at a first wavelength; and
a light path adjuster that is configured to adjust a light path such that input light is guided to a core of the optical waveguide, wherein the optical communication apparatus is configured to communicate using light of a second wavelength that enables the optical waveguide to perform propagation in at least a first order mode in addition to the reference mode, and
wherein the light path adjuster is configured to adjust the light path due to light being refracted by a lens.

2. The optical communication apparatus according to claim 1, wherein
the light path adjuster is configured to adjust the light path due to the light being reflected off a light path adjusting member that includes a tapered surface in which a diameter is gradually decreased toward an entrance side of the optical waveguide.

3. The optical communication apparatus according to claim 1, wherein
the light path adjuster is provided between the core and cladding at an entrance end of the optical waveguide, and
the light path adjuster is configured to adjust the light path using a light path adjusting member that includes a surface in contact with the cladding, the surface being a surface in which a diameter sized equally to a diameter of the core is gradually increased, the light path adjusting member having a refractive index gradually varying in a direction from the core to the cladding, from a refractive index equal to a refractive index of the core to a refractive index equal to a refractive index of the cladding.

4. The optical communication apparatus according to claim 1, wherein
the light path adjuster is provided on an entrance side of the optical waveguide, and
the light path adjuster is configured to adjust the light path using a light path adjusting member that has a refractive index having a gradation structure in which the light path adjusting member has, on an optical axis, a refractive index equal to a refractive index of the core of the optical waveguide, and the light path adjusting member has a refractive index lower at a position, in the light path adjusting member, that is situated vertically further away from the optical axis.

5. The optical communication apparatus according to claim 1, wherein
the first wavelength is a wavelength at which a wavelength dispersion is zero.

6. The optical communication apparatus according to claim 1, wherein
the first wavelength is a wavelength of between 300 nm and 5 μm.

7. The optical communication apparatus according to claim 1, wherein
the first wavelength is a wavelength in a 1310 nm band or a wavelength in a 1550 nm band.

8. The optical communication apparatus according to claim 1, wherein
the second wavelength is a wavelength in an 850 nm band.

9. The optical communication apparatus according to claim 1, wherein
the optical waveguide is an optical fiber.

10. The optical communication apparatus according to claim 1, wherein
the optical waveguide is a silicon optical waveguide.

11. An optical communication method that is performed by an optical communication apparatus that includes an optical waveguide and a light path adjuster, the optical waveguide performing propagation only in a reference mode at a first wavelength, the optical communication method comprising:
adjusting by the light path adjuster, a light path such that input light is guided to a core of the optical waveguide; and
performing communication using light of a second wavelength that enables the optical waveguide to perform propagation in at least a first order mode in addition to the reference mode, wherein the light path adjuster is configured to adjust the light path due to the light being reflected off a light path adjusting member that includes a tapered surface in which a diameter is gradually decreased toward an entrance side of the optical waveguide.

12. An optical communication system, comprising:
a reception section that includes an optical waveguide and a light path adjuster, the optical waveguide is configured to perform propagation only in a reference mode at a first wavelength, the light path adjuster is configured to adjust a light path such that input light is guided to a core of the optical waveguide; and
a transmission section from which light of a second wavelength enters the optical waveguide of the reception section through the light path adjuster, the second wavelength enables the optical waveguide to perform propagation in at least a first order mode in addition to the reference mode,
wherein the light path adjuster is configured to adjust the light path due to light being refracted by a lens.

13. The optical communication system according to claim 12, wherein
the transmission section is a light-emitting element, a receptacle of a transmitter, or a plug of a cable.

* * * * *